US 6,535,314 B1

(12) United States Patent
Mendenhall et al.

(10) Patent No.: US 6,535,314 B1
(45) Date of Patent: Mar. 18, 2003

(54) SATELLITE OPTICAL COMMUNICATION BEAM ACQUISITION TECHNIQUES

(75) Inventors: Todd L. Mendenhall, Rancho Palos Verdes, CA (US); Michael L. Narigon, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/481,924

(22) Filed: Jan. 13, 2000

(51) Int. Cl.$^7$ ................................................ H04B 10/00
(52) U.S. Cl. ........................ 359/172; 359/152; 359/159; 250/491.1
(58) Field of Search ................................ 359/159, 172, 359/152; 250/491.1

(56) References Cited

U.S. PATENT DOCUMENTS

| | | | |
|---|---|---|---|
| 3,504,182 A | 3/1970 | Pizzurro et al. | 250/199 |
| 3,511,998 A | 5/1970 | Smokler | 250/199 |
| 4,017,146 A | 4/1977 | Lichtman | 350/7 |
| 4,982,445 A | 1/1991 | Grant et al. | 455/606 |
| 5,060,304 A | 10/1991 | Solinsky | 359/153 |
| 5,062,150 A | 10/1991 | Swanson et al. | 359/152 |
| 5,282,073 A | 1/1994 | Defour et al. | 359/159 |
| 5,390,040 A * | 2/1995 | Mayeux | 359/152 |
| 5,475,520 A | 12/1995 | Wissinger | 359/172 |
| 5,486,690 A | 1/1996 | Ake | 250/206.1 |
| 5,592,320 A | 1/1997 | Wissinger | 359/159 |
| 5,710,652 A | 1/1998 | Bloom et al. | 359/152 |
| 6,304,354 B2 * | 10/2001 | Carlson | 359/172 |
| 6,347,001 B1 * | 2/2002 | Arnold et al. | 359/159 |
| 6,469,815 B1 * | 10/2002 | Poon et al. | 359/159 |

FOREIGN PATENT DOCUMENTS

| | | |
|---|---|---|
| EP | 0 482 472 A2 | 10/1991 |
| EP | 0 504 022 A1 | 3/1992 |
| EP | 0 847 149 A1 | 8/1997 |
| EP | 0 863 627 A1 | 10/1997 |
| EP | 0 876 013 A1 | 12/1997 |
| EP | 0 883 253 A1 | 6/1998 |
| EP | 0 887 656 A1 | 9/1998 |

* cited by examiner

Primary Examiner—Leslie Pascal
Assistant Examiner—Dzung Tran
(74) Attorney, Agent, or Firm—McAndrews, Held & Malloy, Ltd.

(57) ABSTRACT

A communication system employing an optical beam 16 suitable for transmission of data between a first terminal 12 and a second terminal 22. The apparatus aligns beam 16 from terminal 22 with a beam receptor 92 located in terminal 12 within a first uncertainty region TU which enables tracking of data with beam 16. Optics 50 enables receipt of beam 16 and transmission of the beam along a path 58. A positioning mechanism 150 points the optics 50 to the location of the terminal 22 within a second uncertainty region TU. An acquisition sensor 96 receives at least a portion of beam 16 and locates the terminal 22 within a third uncertainty region, such as the region represented by detector quadrant AQ1, which is larger than region TU but smaller than region RU1. A controller 200 responsive to locating of terminal 22 causes positioning mechanism 150 to move at least a portion of optics 50 to successively adjust the position of the beam path relative to acquisition sensor 96. As a result, the size of the third uncertainty region TU to facilitate the commencement of tracking of beam 16.

145 Claims, 15 Drawing Sheets

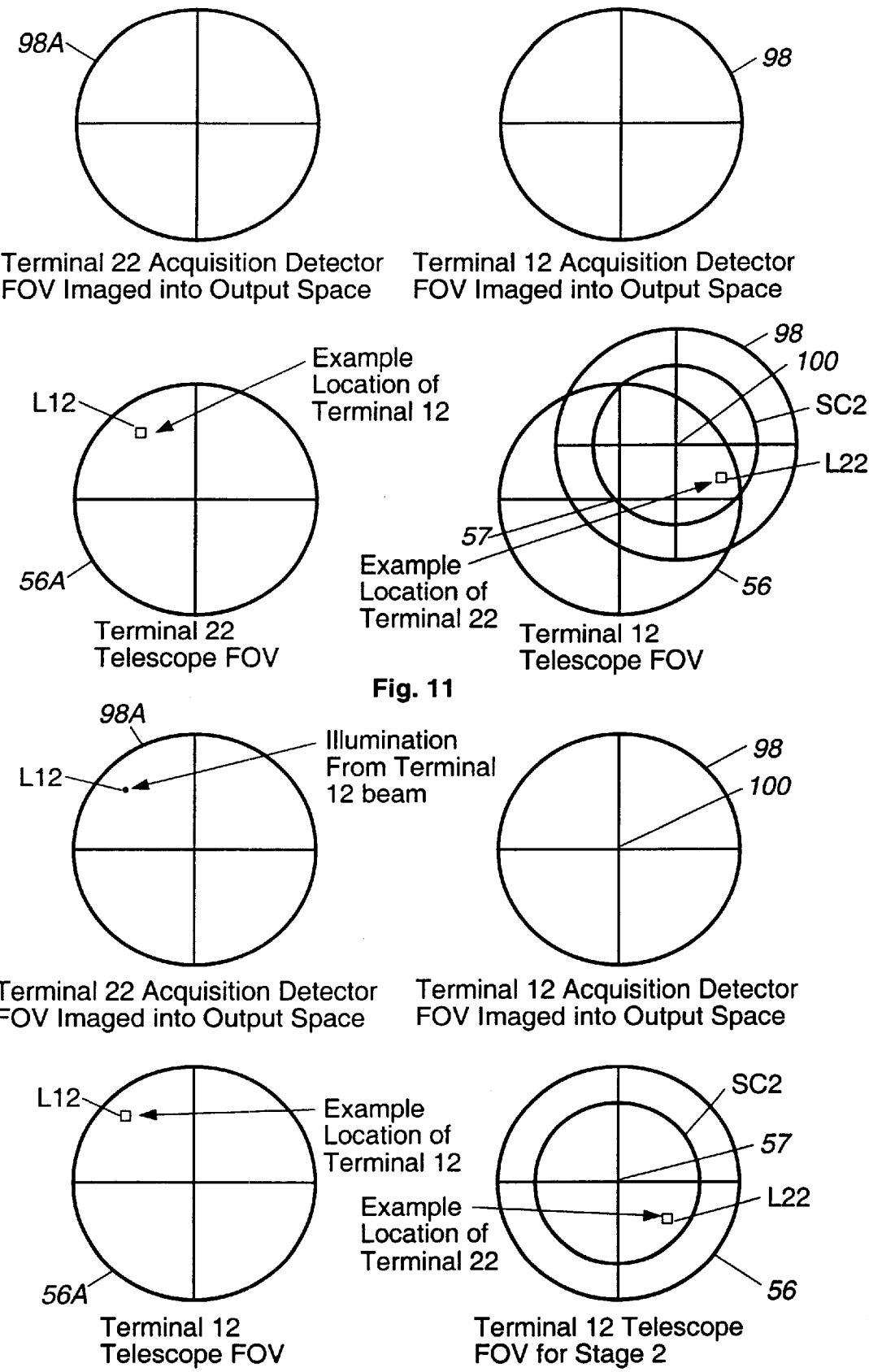

SATELLITE OPTICAL COMMUNICATION BEAM ACQUISITION TECHNIQUES

BACKGROUND OF THE INVENTION

This invention relates to satellite communications and more particularly relates to such communications employing optical beams, such as laser beams.

The beams used for space-to-space and space-to-ground optical communications have extremely narrow beam widths that require high bandwidth, closed loop control for pointing and tracking to maintain adequate signal power for communications. The beam widths are so narrow (on the order of 1–20 microradians) that methods are needed to initially acquire the communications beams from the usual 0.1–0.3 degree pointing knowledge uncertainty of current spacecraft. The acquisition method must be highly robust and minimize total weight and power requirements for the optical communications terminal.

Beam acquisition methods have been described in the past. For example, in columns 9–11 and FIG. 5, U.S. Pat. No. 3,504,182 (Pizzurro et al., issued Mar. 31, 1970) describes an acquisition method in which a first beam of a first satellite dwells at one point in a field of view while a second beam of a second satellite scans the entire field of view. When the beams illuminate their respective satellites, the acquisition terminates.

U.S. Pat. No. 3,511,998 (Smokler, issued May 12, 1970) describes an acquisition method employing slow oscillatory scan motion limited by limit switches. Receipt of a second beam signal during the slow scan motion terminates the acquisition (Column 11).

U.S. Pat. No. 5,060,304 (Solinsky, issued Oct. 22, 1991) describes an acquisition method relying on beam reflection (Abstract).

U.S. Pat. No. 5,282,073 (Defour et al., issued Jan. 25, 1994) describes an acquisition method in which the width of the beam is altered during acquisition (Columns 5–6).

U.S. Pat. No. 5,475,520 (Wissinger, issued Dec. 12, 1995) describes an acquisition method in which multiple transmitted beams are defocused to provide wide area coverage during acquisition (Column 2).

U.S. Pat. No. 5,592,320 (Wissinger, issued Jan. 7, 1997) describes an acquisition method in which a beam is modulated with time or location information during the acquisition (Column 3).

U.S. Pat. No. 5,710,652 (Bloom et al., issued Jan. 20, 1998) describes an acquisition system employing an array of a CCD acquisition camera (Column 5).

Each of these prior methods and systems have limitations which decrease its usefulness.

BRIEF SUMMARY OF THE INVENTION

One apparatus embodiment of the invention is useful in a communication system employing an optical beam suitable for transmission of data between a first terminal located on an earth orbiting satellite and a second terminal remote from the first terminal. Apparatus on the first terminal aligns the beam received from the second terminal with a beam receptor located on the first terminal within a first uncertainty region which allows tracking of the beam with sufficient accuracy to enable communication of data with the optical beam. According to one embodiment of the invention, the apparatus may include optics enabling receipt of the beam and transmission of the beam along a path. A positioning mechanism is used to point the optics to the location of the second terminal within a second uncertainty region larger than the first uncertainty region. An acquisition sensor receives at least a portion of the beam and locates the second terminal within a third uncertainty region larger than the first uncertainty region and smaller than the second uncertainty region. A controller is responsive to the locating of the second terminal to cause the positioning mechanism to move at least a portion of the optics to successively adjust the position of the beam path relative to the acquisition sensor whereby the size of the third uncertainty region successively approaches the size of the first uncertainty region to facilitate the commencement of tracking of the beam.

A second apparatus embodiment of the invention is useful in a communication system employing an optical beam suitable for transmission of data between a first terminal located on an earth orbiting satellite and a second terminal remote from the first terminal. Apparatus on the first terminal aligns the beam received from the second terminal with a beam receptor located on the first terminal to enable tracking of the beam with sufficient accuracy to enable communication of data with the beam. The apparatus preferably comprises optics receiving the beam and defining a first field of view with a first center point. A positioning mechanism points the optics in the direction of the second terminal. An acquisition sensor defines a second field of view with a second center point receiving at least a portion of the beam and locating the second terminal within a portion of the first field of view. A controller responsive to the locating of the second terminal by the acquisition sensor controls the positioning mechanism successively to point the first and second center points toward a region represented by the portion of the first field of view in which the second terminal is determined to be located until at least a portion of the beam is sufficiently aligned with the beam receptor to enable tracking.

A third apparatus embodiment of the invention is useful in a communication system employing a first optical beam and a second optical beam suitable for transmission of data between a first terminal located on an earth orbiting satellite and a second terminal remote from the first terminal. Apparatus on the first terminal transmits the first beam from the first terminal for alignment with a second beam receptor located on the second terminal and aligns the second beam transmitted by the second terminal with a first beam receptor located on the first terminal within a first uncertainty region which allows tracking of the second beam with sufficient accuracy to enable communication of data with the second beam. Optics in the first terminal enable transmission of the first beam and receipt of the second beam. The optics preferably comprise a beam deflector scanning the first beam over a controlled second uncertainty region with a first scan pattern defining a first locus of scan lines having a center scan line. A positioning mechanism points the optics toward the location of the second terminal and moves the beam deflector. An acquisition sensor in the first terminal receives at least a portion of the second beam and determines the location of the second terminal within a third uncertainty region. A controller in the first terminal successively controls the positioning mechanism in response to the location determined by the acquisition sensor to cause the beam deflector successively to point the center scan line into the third uncertainty region to facilitate the commencement of tracking.

A fourth apparatus embodiment of the invention is useful in a communication system employing a first optical beam and a second optical beam suitable for transmission of data between a first terminal located on an earth orbiting satellite and a second terminal remote from the first terminal. Apparatus on the first terminal transmits the first beam from the first terminal for alignment with a second beam receptor located on the second terminal and aligns the second beam transmitted by the second terminal with a first beam receptor located on the first terminal to enable tracking of the second beam with sufficient accuracy to enable communication of data with the second beam. Optics in the first terminal defines a first field of view having a first center point enabling receipt of the second beam. The optics preferably comprises a beam deflector scanning the first beam over a second field of view having a second center point within the first field of view. A positioning mechanism points the optics toward the location of the second terminal and moves the beam deflector. An acquisition sensor defines a third field of view with a third center point in the first terminal receiving at least a portion of the second beam and determines the location of the second terminal within a portion of the third field of view. A controller in the first terminal successively controls the positioning mechanism in response to the location determined by the acquisition sensor to cause the positioning mechanism successively to point the first and second center points toward a region represented by the portion of the third field of view in which the second terminal is located to facilitate the commencement of tracking.

A fifth apparatus embodiment of the invention is useful in a communication system employing a first optical beam and a second optical beam suitable for transmission of data between a first terminal located on an earth orbiting satellite and a second terminal remote from the first terminal. Apparatus on the first terminal transmits the first beam from the first terminal for alignment with a second beam receptor located on the second terminal and aligns and tracks the second beam transmitted by the second terminal with a first beam receptor located on the first terminal with sufficient accuracy to enable communication of data with the second beam. A telescope in the first terminal enables transmission of the first beam and receipt of the second beam at least in part along a common first path. The telescope also defines a first field of view. A movable first beam deflector transmits the first beam to the first path and receives the second beam from the first path. A first beam splitter enables the directing of the first beam from a transmission path onto the first beam deflector and enables the directing of the second beam into a receive path. A track sensor defines a second field of view. A second beam splitter in the receive path directs a predetermined percentage of the beam in the receive path along a track sensor path to the track sensor. An acquisition sensor defines a third field of view. A second beam deflector deflects part of the beam in the receive path along an acquisition sensor path to the acquisition sensor and part of the beam in the receive path onto the beam receptor. First transmission optics transmits the first beam along the transmission path. A movable third beam deflector scans the first beam in a predetermined scan pattern along the transmission path and transmits the scan pattern to the first beam splitter. A controller alters the position of the first beam deflector to adjust the second field of view relative to the track sensor and to adjust the third field of view relative to the acquisition sensor and alters the position of the third beam deflector to adjust the scan pattern to enable tracking to begin.

A first method embodiment of the invention is useful in a communication system employing an optical beam suitable for transmission of data between a first terminal located on an earth orbiting satellite and a second terminal remote from the first terminal. The method aligns the beam received from the second terminal with a beam receptor located on the first terminal and defining a center point within a first uncertainty region which allows tracking of the beam with sufficient accuracy to enable communication of data with the optical beam. The method is accomplished by receiving the beam and transmitting it along a path. The second terminal initially is located within a second uncertainty region larger than the first uncertainty region. The intersection of the beam with the first terminal is detected. The second terminal then is located within a third uncertainty region larger than the first uncertainty region and smaller than the second uncertainty region in response to the detecting. The position of the beam path relative to the beam receptor is successively adjusted in response to the locating of the second terminal within the third uncertainty region whereby the size of the third uncertainty region successively approaches the size of the first uncertainty region to facilitate the commencement of tracking of the beam.

A second method embodiment of the invention is useful in a communication system employing a optical beam suitable for transmission of data between a first terminal located on an earth orbiting satellite and a second terminal remote from the first terminal. The method aligns the beam received from the second terminal with a beam receptor located on the first terminal to enable tracking of the beam with sufficient accuracy to enable communication of data with the beam. The method is accomplished by receiving the beam within a first field of view having a first center point. The occurrence of the beam within the first field of view is detected, and the portion of the first field of view in which the second terminal is located is determined in response to the detecting of the beam within the first field.of view. A second field of view having a second center point is defined in response to locating the second terminal within the portion of the first field of view. The second field receives the beam. The second center point is pointed successively toward a region represented by the portion of the first field of view in which the second terminal is determined to be located until at least a portion of the beam is sufficiently aligned with the beam receptor to enable tracking.

A third method embodiment of the invention is useful in a communication system employing a first optical beam and a second optical beam suitable for transmission of data between a first terminal located on an earth orbiting satellite and a second terminal remote from the first terminal. The method transmits the first beam from the first terminal for alignment with a second beam receptor located on the second terminal and aligns the second beam transmitted by the second terminal with a first beam receptor located on the first terminal within a first uncertainty region which allows tracking of the second beam with sufficient accuracy to enable communication of data with the second beam. The method is accomplished by transmitting the first beam over a controlled second uncertainty region with a first scan pattern defining a first locus of scan lines having a center scan line. The second beam then is received. The location of the second terminal within a third uncertainty region is determined successively in response to receiving the second beam. The center scan line is pointed into the third uncertainty region successively to facilitate the commencement of tracking.

A fourth method embodiment of the invention is useful in a communication system employing a first optical beam and a second optical beam suitable for transmission of data between a first terminal located on an earth orbiting satellite and a second terminal remote from the first terminal. The method transmits the first beam from the first terminal for alignment with a second beam receptor located on the second terminal and aligns the second beam transmitted by the second terminal with a first beam receptor located on the first terminal to enable tracking of the second beam with sufficient accuracy to enable communication of data with the second beam. The method is accomplished by defining a first field of view having a first center point enabling receipt of the second beam. The first beam is transmitted over a second field of view having a second center point within the first field of view. A third field of view with a third center point is defined in the first terminal. At least a portion of the second beam is received. The location of the second terminal within a portion of the third field of view is determined successively. The first and second center points are pointed successively toward a region represented by the portion of the third field of view in which the second terminal is determined to be located to facilitate the commencement of tracking.

A fifth method embodiment of the invention is useful in a communication system employing a first optical beam and a second optical beam suitable for transmission of data between a first terminal located on an earth orbiting satellite and a second terminal remote from the first terminal. The method transmits the first beam from the first terminal for alignment with a second beam receptor located on the second terminal and aligns and tracks the second beam transmitted by the second terminal with a first beam receptor located on the first terminal with sufficient accuracy to enable communication of data with the second beam. The method is accomplished by transmitting the first beam and receiving the second beam at least in part along a common first path in the first terminal. A first field of view for receiving the second beam is defined in the first terminal. The first beam is transmitted to the first path, and the second beam is received from the first path. The second beam is directed into a receive path. The second beam is sensed within a portion of a second field of view along a track sensor path. A predetermined percentage of the beam in the receive path is directed along the track sensor path. The beam is sensed within a portion of a third field of view along an acquisition sensor path. Part of the beam in the receive path is transmitted along the acquisition sensor path and part of the beam in the receive path is transmitted to the beam receptor. The first beam is transmitted along the transmission path, and is scanned in a predetermined scan pattern along the transmission path. The scan pattern is directed from the transmission path to the first path. The second field of view is adjusted relative to the track sensor path, the third field of view is adjusted relative to the acquisition sensor path and the scan pattern is adjusted in response to sensing of the beam within a portion of the third field of view to facilitate the commencement of tracking. By using the foregoing techniques, terminal weight and power can be minimized. For example, a transmit laser source communication beam also can be used for acquisition. There is no need for a separate beacon or beam. The foregoing techniques do not require separate laser sources or mechanisms to provide a wide beam or shaped acquisition beam or beacon. The acquisition quadrant sensor used in the preferred embodiment minimizes electronics cost and power. The time in each stage, the number of stages, and the criteria to transition between stages can be optimized to minimize the acquisition time for a particular application. The ability to acquire and reacquire from intermediate stages minimizes the impact of communication outages by minimizing reacquisition time.

BRIEF DESCRIPTION OF THE DRAWINGS

FIGS. 9–13 are schematic diagrams illustrating the fields of view of an acquisition sensor (e.g., shown in FIG. 4) and a telescope (e.g., shown in FIG. 5) in various modes of operation located in different terminals shown in FIG. 1.

DETAILED DESCRIPTION OF THE INVENTION

Figure 1A:
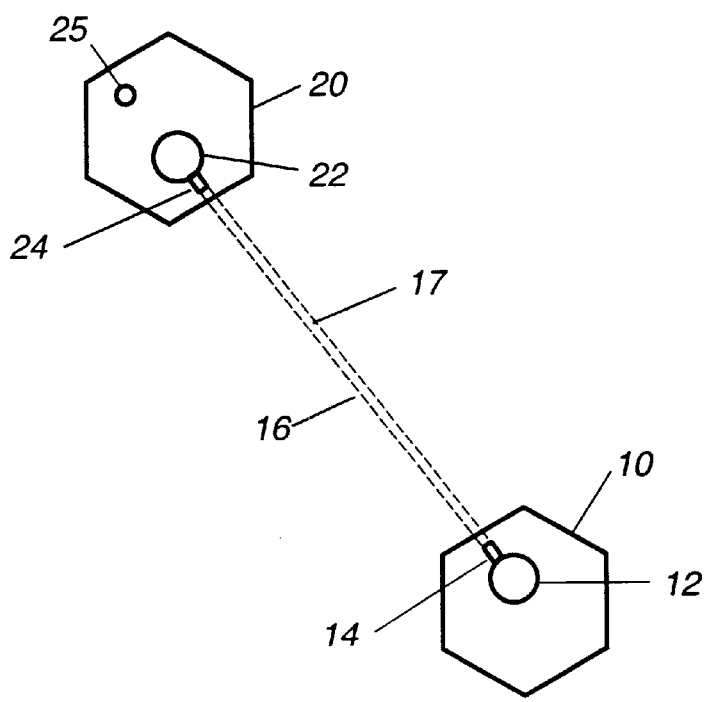
FIG. 1a is a schematic block diagram of a pair of earth orbiting satellites incorporating terminals which transmit and receive optical beams, such as laser beams, which may use the acquisition techniques of the present invention.

Referring to FIG. 1a, the present invention allows optical beams used for communication to be aligned with communication terminals located on earth-orbiting satellites. The alignment process is generally known as acquisition. As shown in FIG. 1a, earth orbiting satellite 10 carries a communication terminal 12 which includes a telescope 14 for sending and receiving optical beams 16 and 17. Another earth orbiting satellite 20 carries a communication terminal 22 including a telescope 24 for sending and receiving beams 16 and 17. Beam 17 is aligned with a beam receptor 25.

Although the beams 16 and 17 are shown separated in FIG. 1, in fact the beams follow a common path through telescopes 14 and 24. The beams are transmitted using complimentary frequencies. For example, beam 16 is transmitted at 1.554 microns and beam 17 is transmitted at 1.546 microns. Terminals 12 and 22 provide full duplex operation at 6.75 Gbps. Beams 16 and 17 are both diffraction limited. They are not spread or defocused and are modulated to transmit data after acquisition is completed.

Figure 1B:
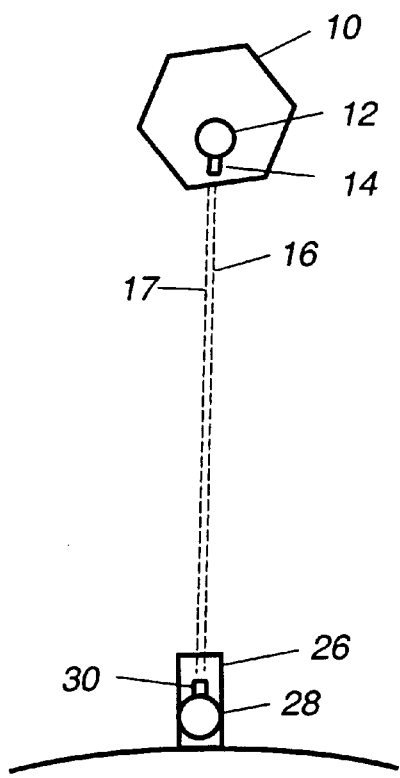
FIG. 1b is a schematic block diagram of an earth orbiting satellite and a ground station incorporating terminals which transmit and receive optical beams, such as laser beams, which may use the acquisition techniques of the present invention.

Referring to FIG. 1b, the present invention allows optical beams used for communication to be aligned with a communication terminal located on an earth-orbiting satellite and with a terminal located on a ground station. Ground station 26 includes a terminal 28 with a telescope 30 which transmits and receives beams 16 and 17 previously described. Each of terminals 12, 22 and 28 is identical. As a result, only one such terminal is described-in this specification.

Figure 2:
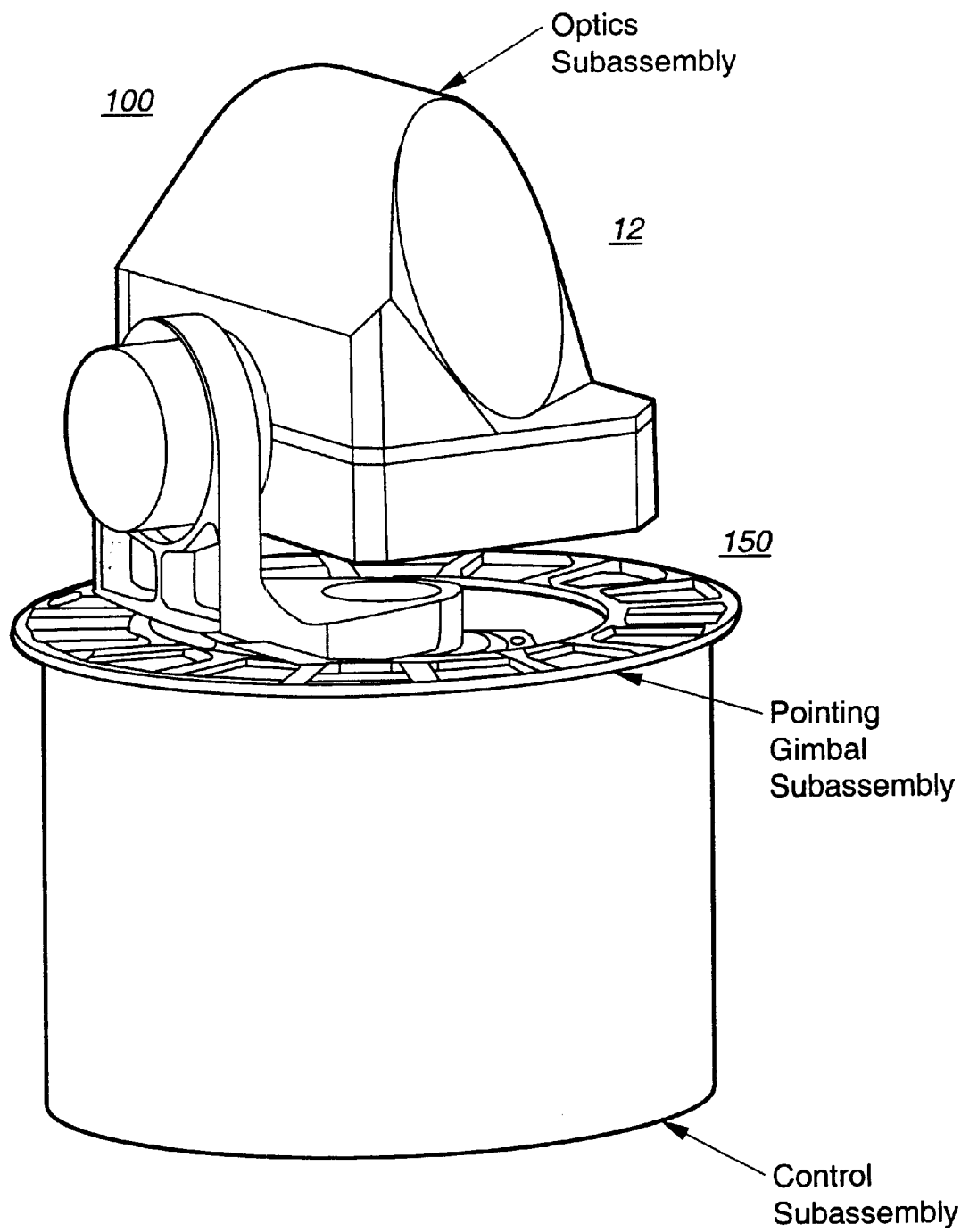
FIG. 2 is a perspective view of a housing suitable for enclosing one embodiment of the invention.
Figure 3:
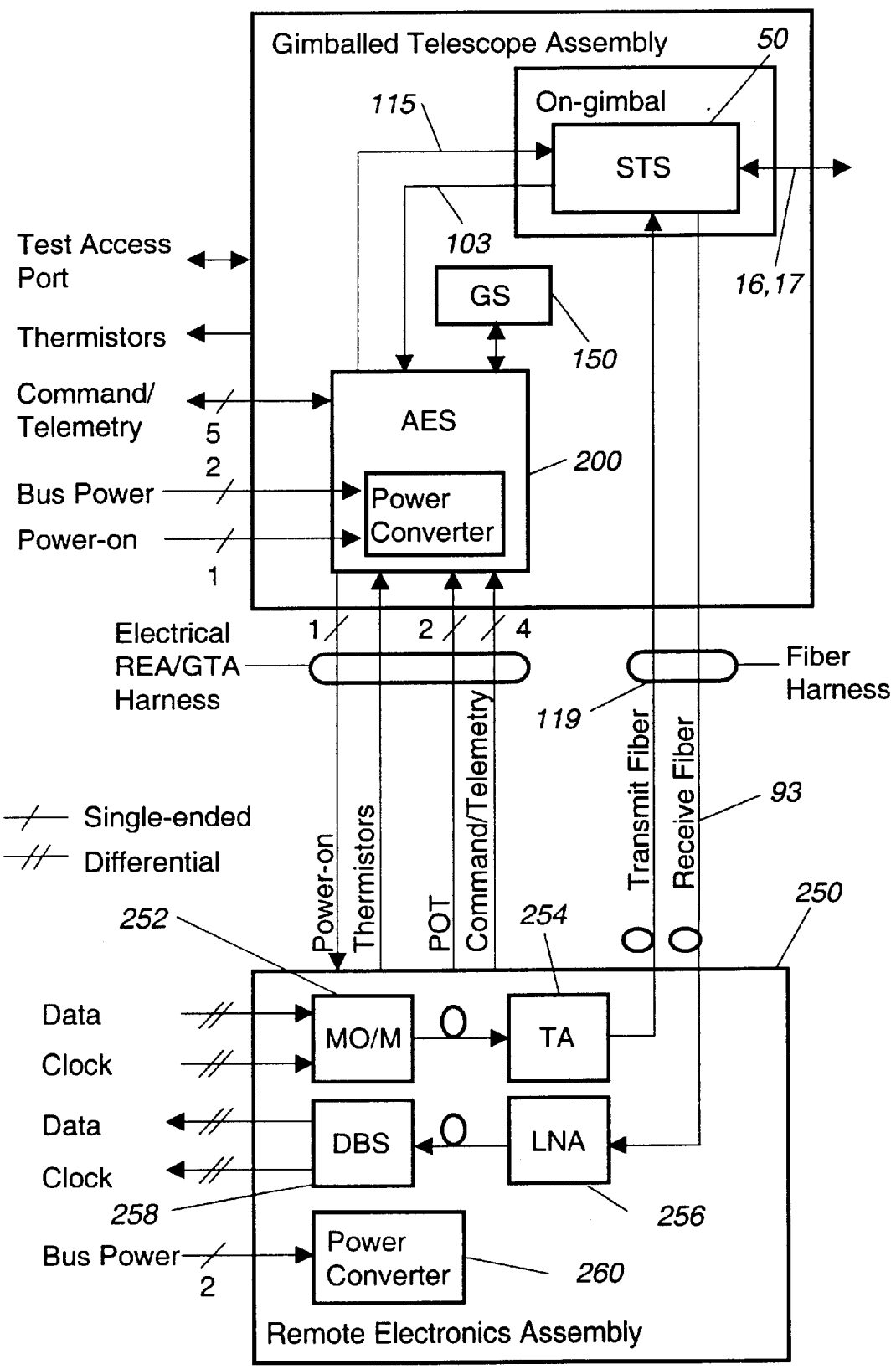
FIG. 3 is a general schematic block diagram of one embodiment of the invention.
Figure 7:
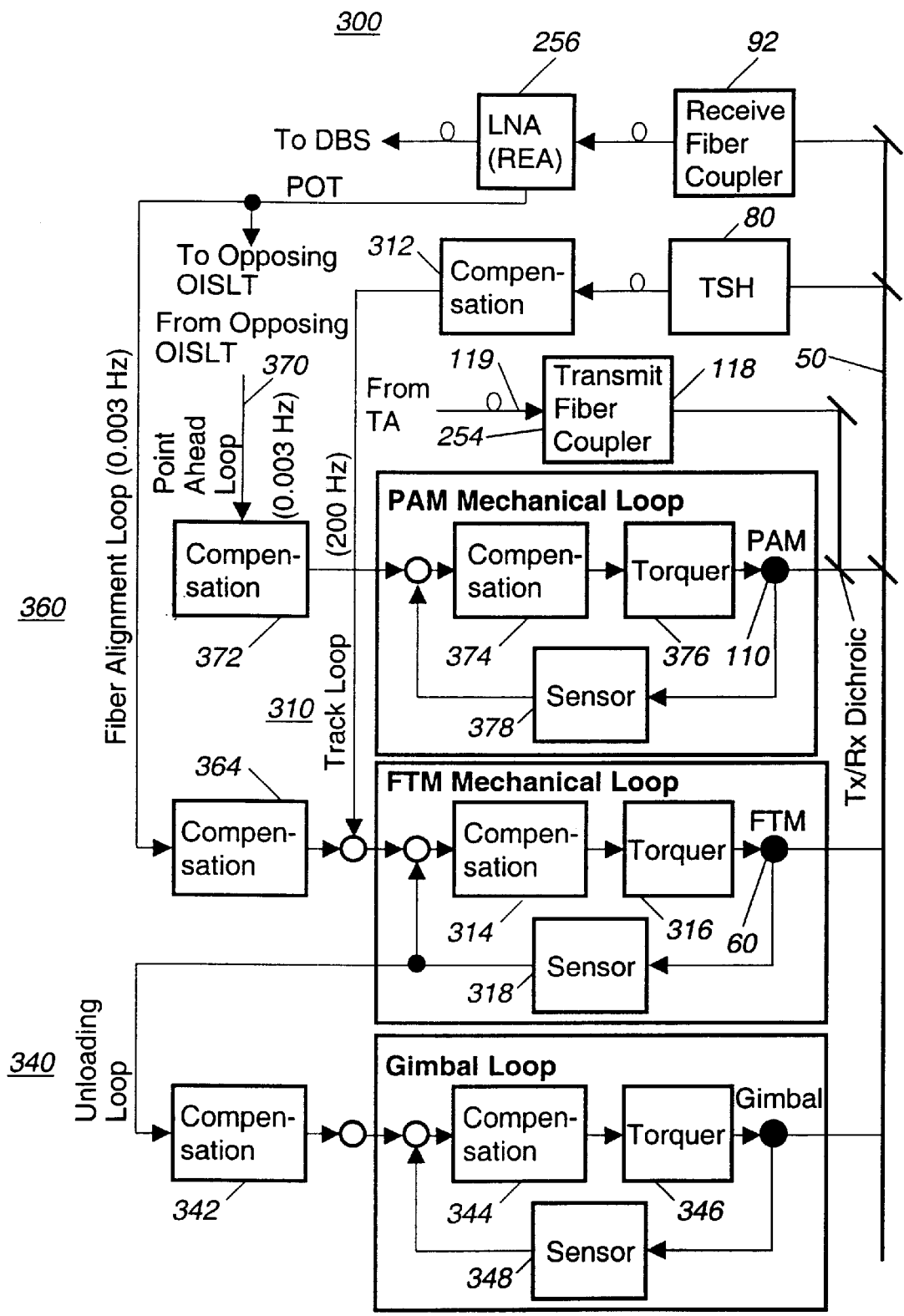
FIG. 7 is a schematic block diagram of a preferred form of servo loops for controlling the positioning module shown in FIG. 6, the point ahead mechanism shown in FIG. 4 and the fine track mechanism shown in FIG. 4.

Referring to FIGS. 2, 3 and 7, a preferred beam acquisition system for terminal 12 made in accordance with the invention basically comprises an optics subassembly (STS) 50, a gimbal-positioning subassembly (GS) 150, an electronics control subassembly (AES) 200, a remote electronics assembly 250, and pointing and tracking control loops 300.

Figure 5:
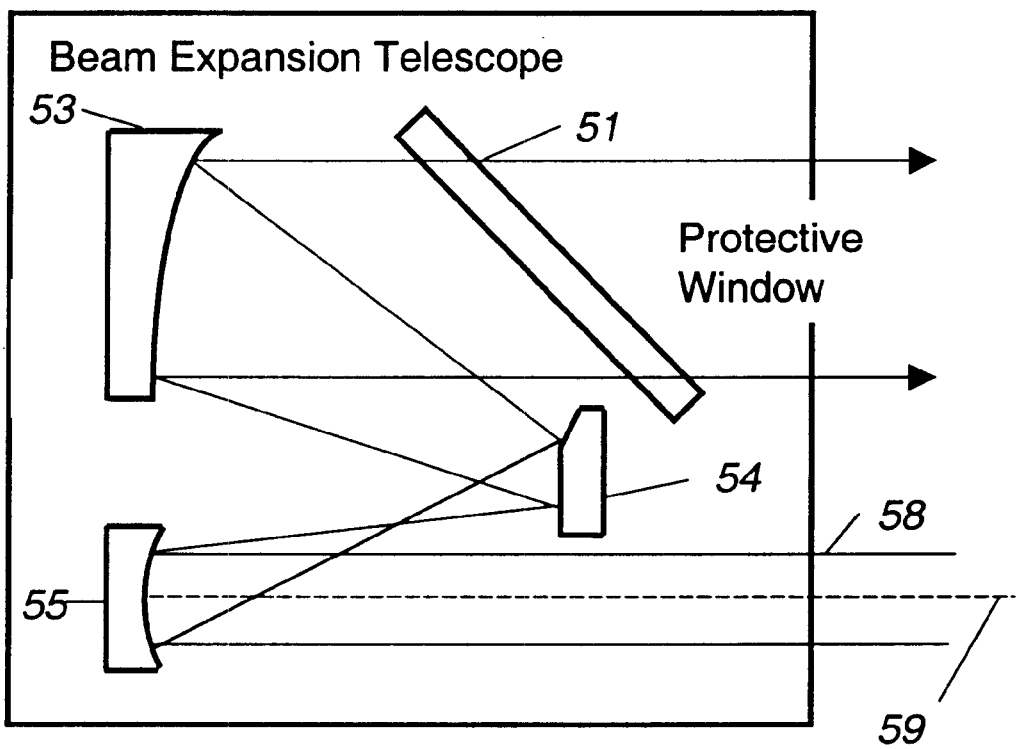
FIG. 5 is a schematic block diagram illustrating one embodiment of a beam expansion telescope suitable for use with the optics module shown in FIG. 4 in which the telescope is rotated 90 degrees from the position shown in FIG. 4.

Referring to FIG. 5, optic subassembly 50 includes telescope 14 (FIG. 1) which comprises a protective window 51 and mirrors 53–55 arranged as shown. Telescope 14 is coursely positioned using a means known to those skilled in the art so that it is pointed in the direction of terminal 22 on satellite 20 within a first region of uncertainty. Telescope 14 is a diamond-turned, off-axis, three-mirror anastigmat system made of silicon carbide which can be assembled without alignment. Silicon carbide systems also are advantageous because they inherently have less sensitivity to temperature changes than other types of telescopes. Window 51 has a silicon substrate with a silicon dioxide anti-reflective coating on the exterior surface to protect the interior optical surfaces from particulates, micrometeorites, and ion exposure. Window 51 has a bandpass AR coating which provides attenuation of solar radiation above 1550 nanometers. Sapphire is also an option for the substrate if warranted by the environmental effects. If sapphire is employed, a silicone substrate bandpass filter is sandwiched with the sapphire window. An especially preferred form of telescope 14 is described in the commonly assigned application entitled, "Optical Inter-Satellite Link (OISL) Gimbal," Application Ser. No. 09/346052, filed on Jul. 7, 1999 in the names of Dan R. Johnson, Mark A. Carroll and Daniel R. Sherman, which is incorporated by reference.

Telescope 14 defines a field of view 56 having a center point 57 (FIG. 9), and defines a common beam path 58 for beams 16 and 17 (FIG. 1A). Path 58 is centered on center point 57 which defines an axis 59 passing through the center point and parallel to beam path 58 (FIG. 5).

Figure 4:
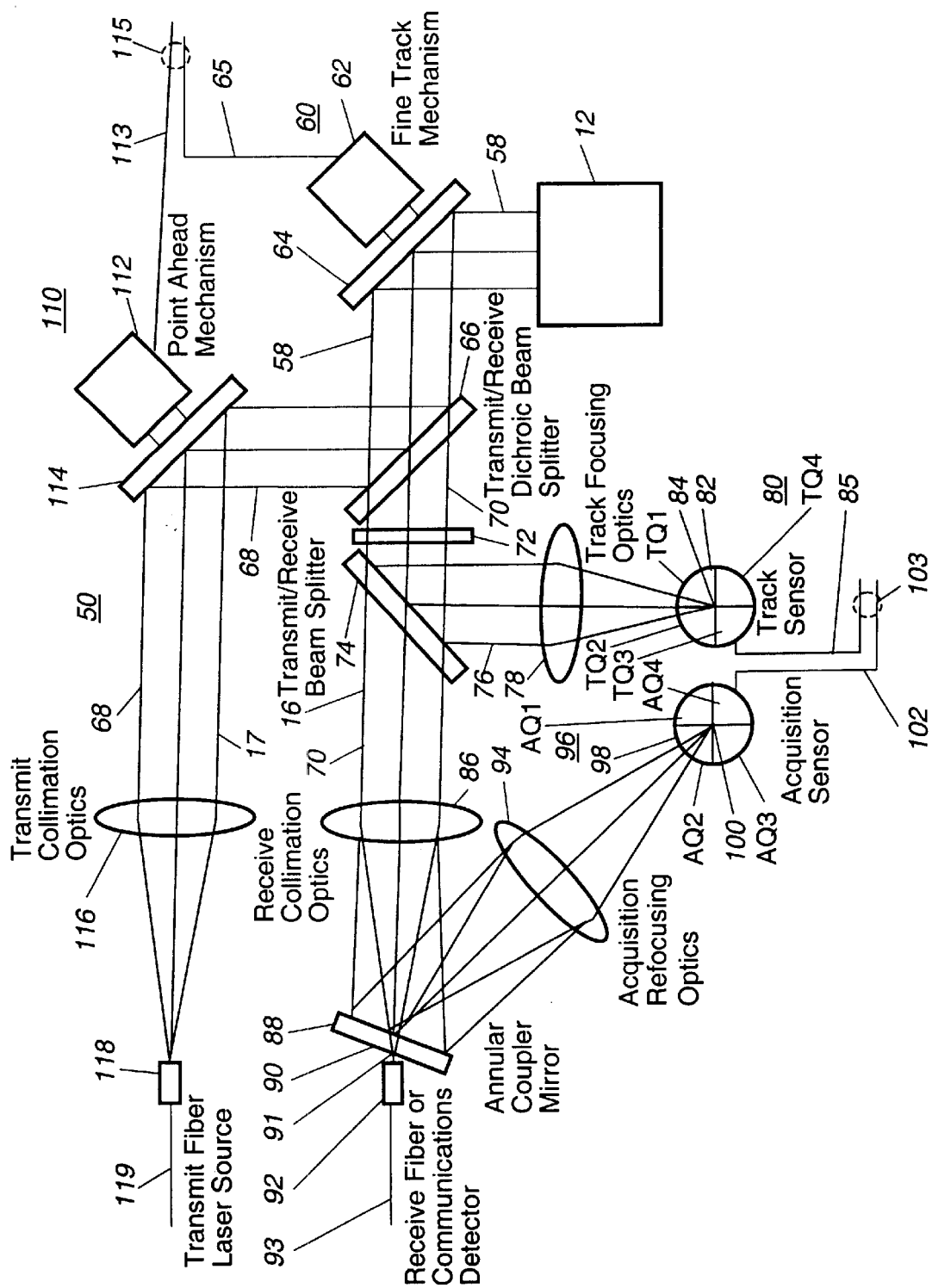
FIG. 4 is a schematic block diagram of a preferred form of an optics module made in accordance with the invention.

Referring to FIG. 4, optics subassembly 50 also includes a fine track mechanism 60 which comprises an electromagnetically driven two axis gimbal assembly 62 flexure-mounted to a mirror 64 that deflects optical beams 16 and 17. Mechanism 60 is provided with integral angle sensing and a high bandwidth pointing control over plus or minus 0.5 degrees of mechanical travel. Control signals are transmitted over a cable 65. An especially preferred form of mechanism 60 is described in the commonly assigned application entitled "Fine Pointing Assembly Configuration", TRW Docket No. 11-1040, filed on the same date as this application in the names of Ashley, C. Danial and Arthur P. Balz, which is incorporated by reference.

Optic subassembly So also includes a dichroic beam splitter 66 which divides the optical path into a transmit path 68 and a receive path 70. A narrow band pass filter 72 allows passage of the receive beam and discriminates against the transmit beam which uses a different frequency than the receive beam. A track/receive beam splitter 74 diverts about 10% of the beam in receive path 70 to a track sensor path 76. The portion of the beam in path 76 is focused by focusing optics 78 (including one or more lenses or mirrors) on a track sensor 80.

Track sensor 80 defines a field of view 82 located on a photo detector comprising four tracking quadrants TQ1-TQ4. Both the field of view and the tracking quadrants define a common center point 84. The photo detector within track sensor 80 is fabricated from InGaAs. Track sensor 80 is associated with two sets of electronics. The first set causes a detector to respond to optical pulses of a particular temporal nature. In addition, the first set of track sensor electronics processes the sum of all four quadrants in the photodetector as well as each quadrant individually. The second set of electronics generates track error signals in order to keep beams 16 and 17 on track after the acquisition phase is completed.

A particularly preferred form of tracking sensor 80 is described in the commonly assigned application entitled "Inter-Satellite Optical Link Track Sensor," Application No. 09/301494, filed on Apr. 28, 1999 in the names of Chie Poon, Robert C. Carden, and Robert M. Englekirk, which is incorporated by reference.

The 90% of the receive beam transmitted through beam splitter 74 is received by collimation optics 86 which includes one or more lenses or mirrors. Optics 86 focuses a portion of the receive path beam on an annular mirror 88 which defines a central hole 90. A portion of the beam transmitted through the central hole is focused on a fiber coupler 92 that transmits the portion of the beam to an optical fiber 93. Coupler 92 and fiber 93 serve as a beam receptor for the beam in receive path 70. Fiber coupler 92 and fiber 93 are the eventual recipients of the beam 16 energy directed toward terminal 12 by terminal 22. After acquisition, communication signal information impressed on beam 16 received from terminal 22 is decoded by remote electronics assembly 250. The portion of the beam falling on annular mirror 88 is reflected through an acquisition refocusing optics 94 (including one or more lenses or mirrors) and is focused onto an acquisition sensor 96.

Beam splitter 74 and mirror 88 are arranged such that about 10% of the beam in receive path 70 is focused on track sensor 80, with the remainder of the beam in the receive path 70 focused either on acquisition sensor 96 or on the fiber coupler 92, depending on the tilt angle of the collimated beam. Techniques for focusing an optical beam on a fiber coupler are known to those skilled in the art and are described in U.S. Pat. No. 5,062,150 (Swanson, issued Oct. 29, 1991). Techniques for transmitting and receiving beams and aligning them with sensors, a laser diode and mirror are described in U.S. Pat. No. 5,390,040 (Mayeax, issued Feb. 14, 1995).

Acquisition sensor 96 includes a photo detector divided into four acquisition quadrants AQ1-AQ4 which define a field of view 98. Both the field of view 98 and the photo detector have a common center point 100. Acquisition sensor 96 comprises a quadrant detector sensitive to the wavelength used for communication together with electronics that processes the signals from each quadrant designed to detect pulses of optical energy of beam 16 with a temporal nature to be described later. The acquisition sensor has a field of view suitable for covering the entire first uncertainty region, i.e., if the uncertainty region is 0.25°, the acquisition sensor field is 0.25°. Center point 100 of acquisition sensor field of view 98 is aligned with center point 84 of field of view 82 of track sensor 80. Similarly, center point 100 of field of view 98 of acquisition sensor 96 is aligned with center point 91 of fiber coupler 92. An especially preferred form of acquisition sensor 96 is described in the commonly assigned application entitled "Inter-Satellite Optical Link Acquisition Sensor," Application No. 09/301297, filed on Apr. 18, 1999 in the names of Chie W. Poon, Robert C. Carden and Robert M. Englekirk, which is incorporated by reference.

The optics 78, 86, 94 are designed so that the field of view of 98 acquisition sensor is about 20 to 50 times larger than field of view of track sensor 82. Field of view 98 is substantially the same size as field of view 56 of telescope 14. The size of field of view 98 is controlled by optics 94, and the size of field of view 82 is controlled by optics 78.

The various outputs from track sensor 80 are transmitted over a cable 85 for further processing. Various outputs from acquisition sensor 96 are transmitted over a cable 102 for further processing. Cables 85 and 102 are combined into a cable 103.

Fine track mechanism 60 is used to simultaneously direct the center points 100 and 84 of the fields of view of the acquisition sensor 96 and track sensor 80 and transmit beam 17 toward the estimated position of the opposing terminal (e.g., terminal 22) as determined by acquisition sensor 96.

Optics subassembly 50 also includes a point ahead mechanism 110 which is identical to fine track mechanism 60 except for an increased field of regard to accommodate the scan angle required for acquisition (driven primarily by the 0.1 degree uncertainty in spacecraft attitude and position). Point ahead mechanism 110 includes a two axis gimbal assembly 112 which moves a mirror 114 through about plus or minus 2.25 degrees of mechanical travel. Point ahead control signals are transmitted over a cable 113 which is combined with cable 65 to form a cable 115. Point ahead mechanism 110 directs transmit beam 17 along transmit path 68 relative to center point 100 of field of view 98 of acquisitions sensor 96.

Point ahead mechanism 110 is designed with sufficient range to allow the transmit beam 17 to be directed anywhere within the field of view 98 of acquisition sensor 96. This range is extended over that normally required for transmit/receive point ahead during tracking and communication. Point ahead mechanism 110 has the range, bandwidth, resolution, and accuracy required to direct transmit beams 17 over the acquisition sensor field of view 98 in the manner to be described later and corrects for the apparent location of the opposing terminal, (e.g., terminal 22) due to the opposing terminal's velocity and light travel time. An especially preferred form of point ahead mechanism 110 is described in the commonly assigned application entitled "Fine Pointing Assembly Configuration," filed on the same date as this application in the names of Ashley C. Danial and Arthur P. Balz which is incorporated by reference.

Included in transmit path 68 is transmit collimation optics 116 (which includes one or more lenses) and which collimates the transmit beam 17 propagated from a transmit coupler 118 which receives the beam over an optical fiber 119. The transmit beam 17 is steered differently from the receive beam 16 line of sight by the point ahead mechanism 110 to compensate for beam travel time to a remote terminal, such as terminal 22 (FIG. 1A). Point ahead mechanism 110 also scans beam 17 during the acquisition process.

Figure 6:
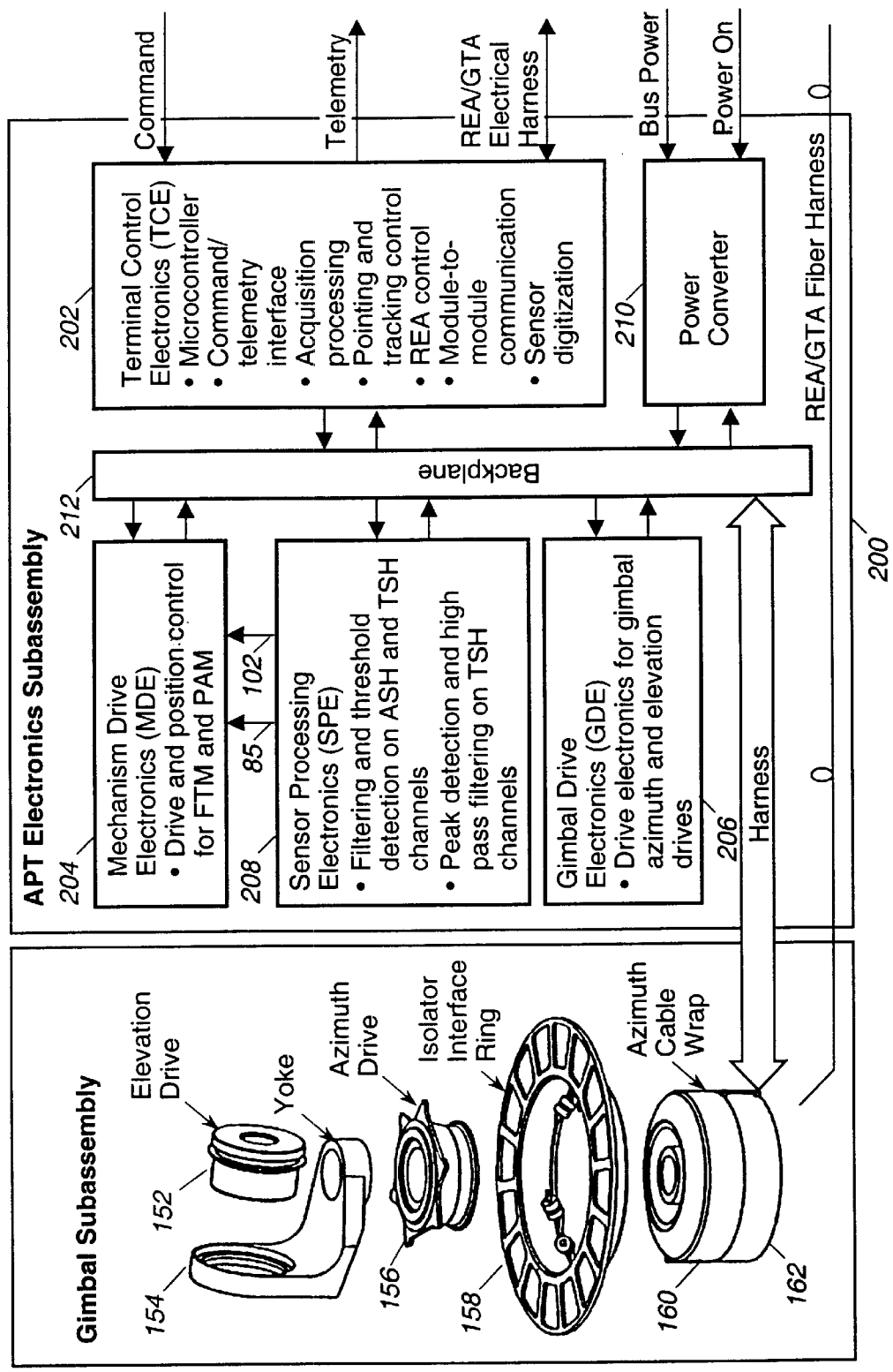
FIG. 6 is a fragmentary perspective view of one embodiment of a positioning module for moving the telescope shown in FIG. 5 and a schematic block diagram of a preferred form of control circuitry for controlling the positioning module shown in FIG. 6, the sensors shown in FIG. 4, the point ahead mechanism shown in FIG. 4 and the fine track mechanism shown in FIG. 4.

Referring to FIG. 6, positioning subassembly 150 comprises an elevation drive 152 which moves telescope 14 through approximately −3 to +26 degrees of elevation. The change in azimuth of telescope 14 is accomplished by a yoke 154 which is driven by an azimuth drive 156 through approximately ±80 degrees of azimuth field regard.

Positioning subassembly 150 is a two-axis gimbal for course pointing of telescope 14. Both the elevation and azimuth gimbal axes use permanent magnet brushless motors (i.e., drive 152 and drive 156) and a rotary variable differential capacitive angle sensor. A particularly preferred embodiment of positioning subassembly 150 is shown in the commonly assigned application entitled, "Optical Inter-Satellite Link (OISL) Gimbal," Application Ser. No. 09/346052, filed on Jul. 7, 1999 in the names of Dan R. Johnson, Mark A. Carroll and Daniel R. Sherman which is incorporated by reference. A particularly preferred embodiment of the capacitive angle sensor is described in the commonly assigned application entitled "Capacitive Resolver," Application Ser. No. 09/310365, filed on May 12, 1999 in the names of Dan R. Johnson, Daniel R. Sherman and Paul A. Franson which is incorporated by reference. Elevation drive 152 and azimuth drive 156 are supported by an isolator interface ring 158. The ring reduces pointing disturbances from satellite 10 (FIG. 1A). Isolator 158 consists of six passively damped spring elements arranged in a Stuart Platform configuration which provides the same fundamental frequency in all six degrees of freedom. The isolator spring elements are highly damped using acrylic visco-elastic material. Isolator 158 is designed to have a 10–15 Hz. corner frequency and to provide greater than 10decibels attenuation of satellite disturbances at 100 Hz.

Positioning subassembly 150 also includes an azimuth cable wrap 160 and a base 162.

Still referring to FIG. 6, control subassembly 200 comprises terminal controller electronics 202 which performs computing functions for the control subassembly. For example, electronics 202 provides the command/telemetry interface to the satellite payload processor, performs internal digital processing for control of fine track mechanism 60 and point ahead mechanism 110 during the acquisition process, and implements control for remote electronics assembly 250. The internal processing of electronics 202 include sensor digitization and control for a track loop, unloading loop, a fiber alignment loop, and a point-ahead loop, along with the required module-to-module communication. Electronics 202 also receives power on/off commands and performs power commanding for remote electronics assembly 250.

Control sub-assembly 200 also includes mechanical drive electronics 204 which provides drive and position control functions for fine track mechanism 60 and point ahead mechanism 110. Electronics 204 also provides analog to digital and digital to analog functions as needed.

Control subassembly 200 also includes gimbal drive electronics 206 which provides the drive electronics for elevation drive 152 and azimuth drive 156.

Control subassembly 200 also includes sensor processing electronics 208 which process the outputs from track sensor 80 and acquisition sensor 96.

Control subassembly 200 also includes a power converter 210 which supplies separate analog and digital power to various components of the control subassembly 200. The various electronics modules of control sub-assembly 200 are connected through a conventional back plane 212.

Referring to FIG. 3, remote electronics assembly 250 comprises a master oscillator/modulator (Mo/M) 252 which receives a 6.75 Gbps serial data and clock from the satellite 10 payload on differential lines. After the acquisition phase, Mo/M 252 modulates beam 17 with communication data. The encoded data modulates the output of a continuous wave master oscillator using a dual-electrode push-pull Mach-Zehnder low-biased to operate as a phase modulator using an active control loop. The distributed feedback master oscillator laser is wave length controlled via active temperature control to within the tracking range of the optical modulator on the receiver end. The deskew, scrambler/differential encoder, and driver amplifier for the modulator are mounted on the front side of the module.

Assembly 250 also comprises a transmit amplifier (TA) 254 which boosts the low-level modulator output to about 300 milliwatts for transmission.

Assembly 250 also includes a low-noise amplifier (LNA) 256 which comprises a low-noise Er fiber amplifier. The signal is filtered before demodulation and detection. Amplifier 256 also includes a tunable.filter that closely matches the optical bandwidth to the signal bandwidth. The filter center frequency tracks the optical frequency of the input signal to compensate for Doppler shift or master oscillator wavelength drift.

Assembly 250 also comprises a demodulator bit synchronizer (DBS) 258. After the acquisition phase, communication data in beam 16 is demodulated by the combination of an asymmetric Mach-Zehnder interferometer and a balanced photo detector/differential transimpedence amplifier. The demodulator splits the optical signal into two paths with a differential delay of 1-bit. The paths are then recombined to form a sum and difference output. When a "zero" bit is transmitted, the phase of the optical carrier is left unchanged from the previous bit by the DPSK modulator. Optical signals from the two paths add constructively on the sum output and destructively on the difference output, resulting in a positive voltage at the transimpedence amplifier output. When a "one" is transmitted, the phase of the optical carrier changes by 180° relative to the previous bit and the opposite occurs, resulting in a negative voltage at the transimpedence amplifier output.

The bit synchronization recovers a data clock and detects the bits from the low pass filtered analogue wave form. Since the modulation receiver uses a balance detector, no threshold control is necessary. The bits synchronization output is descrambled and output on a serial 6.75 Gbps differential interface along with the recovered clock.

Assembly 250 also comprises a power converter 260 which includes three commercially available converter modules and filters.

Referring to FIG. 7, pointing and tracking control loops 300 comprise a track loop 310 including a compensation circuit 312 which provides a signal to a fine tracking mechanism mechanical loop including a compensation circuit 314, a torquer circuit 316 and a sensor 318 connected as shown. The fine tracking mechanism mechanical loop controls the operation of fine tracking mechanism 60 (FIG. 4). Track loop 310 tracks the angular position of an opposing terminal (such as terminal 22) (FIG. 1A)) to maintain coupling of the received optical energy into receive fiber 93 (FIG. 4), the error signal from the tracking sensor 80 measurements is used to adjust the fine track mechanism 60 pointing angle.

Figure 9:
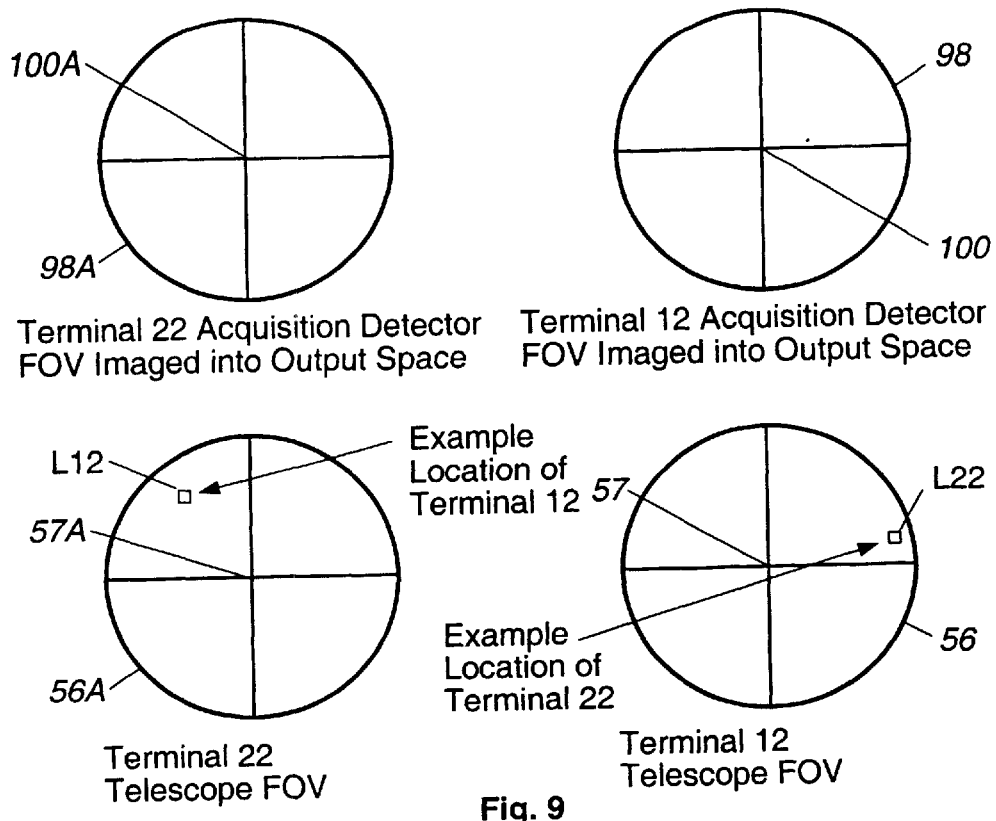

Control loops 300 also include an unloading loop 340 (FIG. 7) which comprises a compensation circuit 342 that feeds a signal into a gimbal loop which includes a compensation circuit 344, a torquer 346 and a sensor 348 connected as shown. The gimbal loop drives elevation drive 152 and azimuth drive 156 (FIG. 6). The unloading loop transfers the fine track mechanism 60 angular position to elevation drive 152 and azimuth drive 156 to keep the fine track mechanism within its mechanical range. That is, center point 57 is aligned with center points 84 and 100 (FIGS. 9 and 4).

Control loops 300 also comprise a fiber alignment loop 360 (FIG. 7) which comprises low noise amplifier 256 (FIG. 3) and a compensation circuit 364 which provides a signal to the fine track mechanism mechanical loop previously described. The output of the fine track mechanism alters the relationship of the receive beam to receive fiber coupler 92 as shown in FIG. 7. The fiber alignment loop is a low-bandwidth loop to correct alignment errors between fiber receive coupler 92 and track sensor 80. Fine track mechanism 60 applies a small tilt dither in the receive beam; variation in power on target telemetry from the remote electronics assembly low noise amplifier 256 then corrects to the track sensor 80 angular bias.

Control loops 300 also comprise a point ahead loop 370 (FIG. 7) which includes a compensation circuit 372 that provides a signal to a point ahead mechanism mechanical loop that includes a compensation circuit 374, a torquer 376 and a sensor 378 connected as shown. The point ahead mechanism mechanical loop controls the operation of point ahead mechanism 110 (FIG. 4). The point ahead loop 370 continually corrects for point ahead misalignment. Initial point ahead is based on pointing angles derived from satellite ephemeris. After acquisition, power on target measurements from the opposing terminal (e.g., terminal 22, FIG. 1A) communicated across the optical link in optics assembly 50 produce corrections to the position of point ahead mechanism 110. Opposing terminals, (e.g., terminals 12 and 22) dither at different frequencies (nominally 5 and 7 Hz) so that point-ahead error can be distinguished from fiber alignment error.

Figure 8:
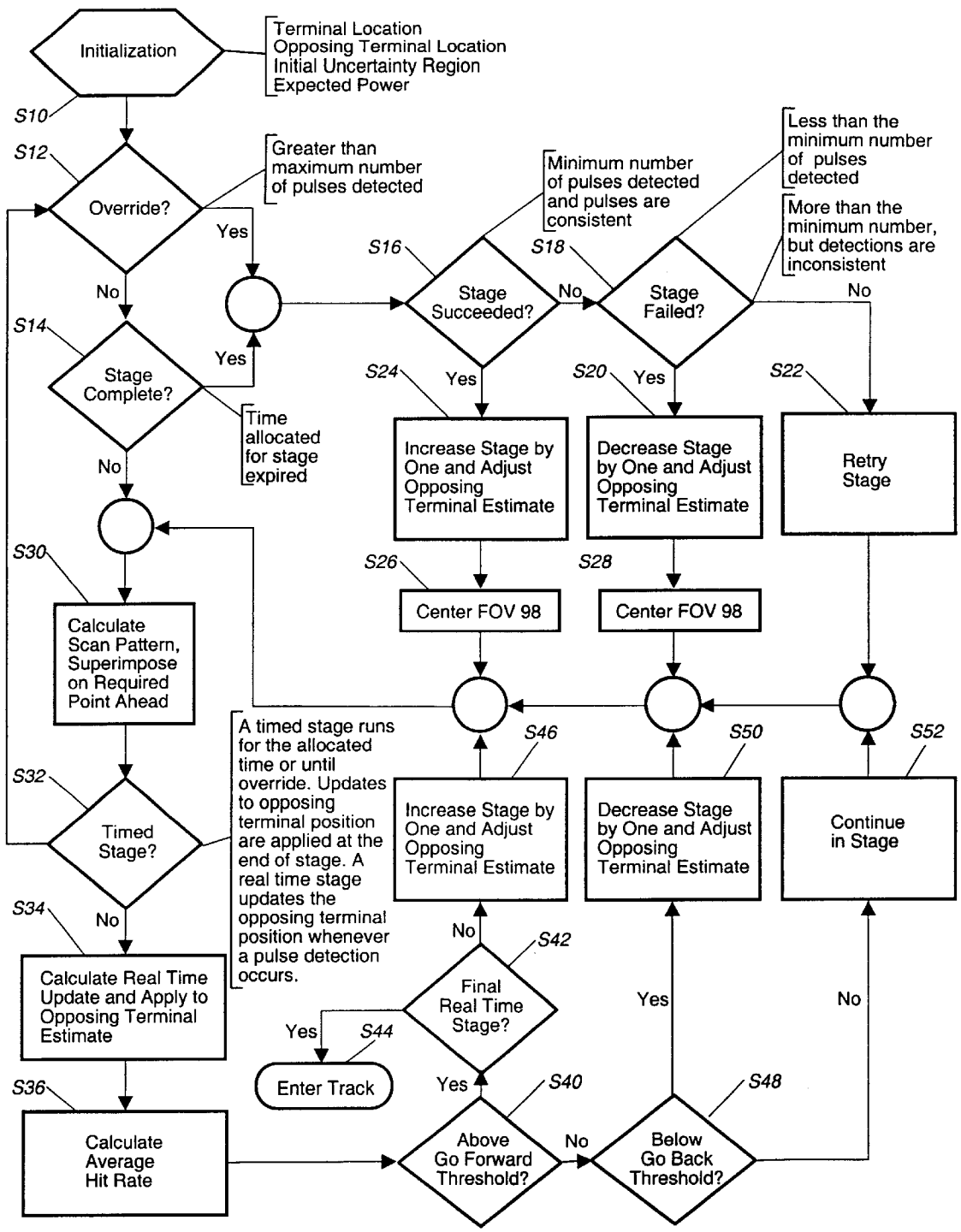
FIG. 8 is a flow diagram illustrating a preferred form of operation of the apparatus shown in FIG. 4.

The apparatus described in FIGS. 1–7 is operated during the acquisition procedure as illustrated in FIG. 8. During an initialization step performed on satellite 10, the approximate position of terminal 22 on satellite 20 is received within an initial uncertainty region. Since satellite 10 knows its approximate current location, it can anticipate the power of beam 16 when it is received from terminal 22.

During step S10, the acquisition logic of terminal 12 in satellite 10 is loaded with information on the location in space of terminal 22 on satellite 20 within an initial uncertainty region RU1 (FIGS. 14 and 15), the expected power level of beam 16 to be received from terminal 22, and data base parameters defining conditions for transitions between acquisition stages. Once this information is loaded, the acquisition process is commanded to start by external means. No further coordinating messages by external means between terminals 12 and 22 are required.

Each of terminals 12 and 22 directs the center of its acquisition sensor (e.g., center point 100) and track sensor (e.g., center point 84) towards the estimated position of the opposing terminal by its fine track mechanism (e.g., fine track mechanism 60). The fine track mechanisms in terminals 12 and 22 are continually updated to maintain the center points of the fields of view of the respective sensors towards the estimated position of the opposing terminal. Each terminal then uses its point ahead mechanism (e.g., point ahead mechanism 110) to scan out the uncertainty region RU1 with a transmitted beam (e.g., beam 17) using a spiral scan pattern with particular characteristics.

Figure 16:
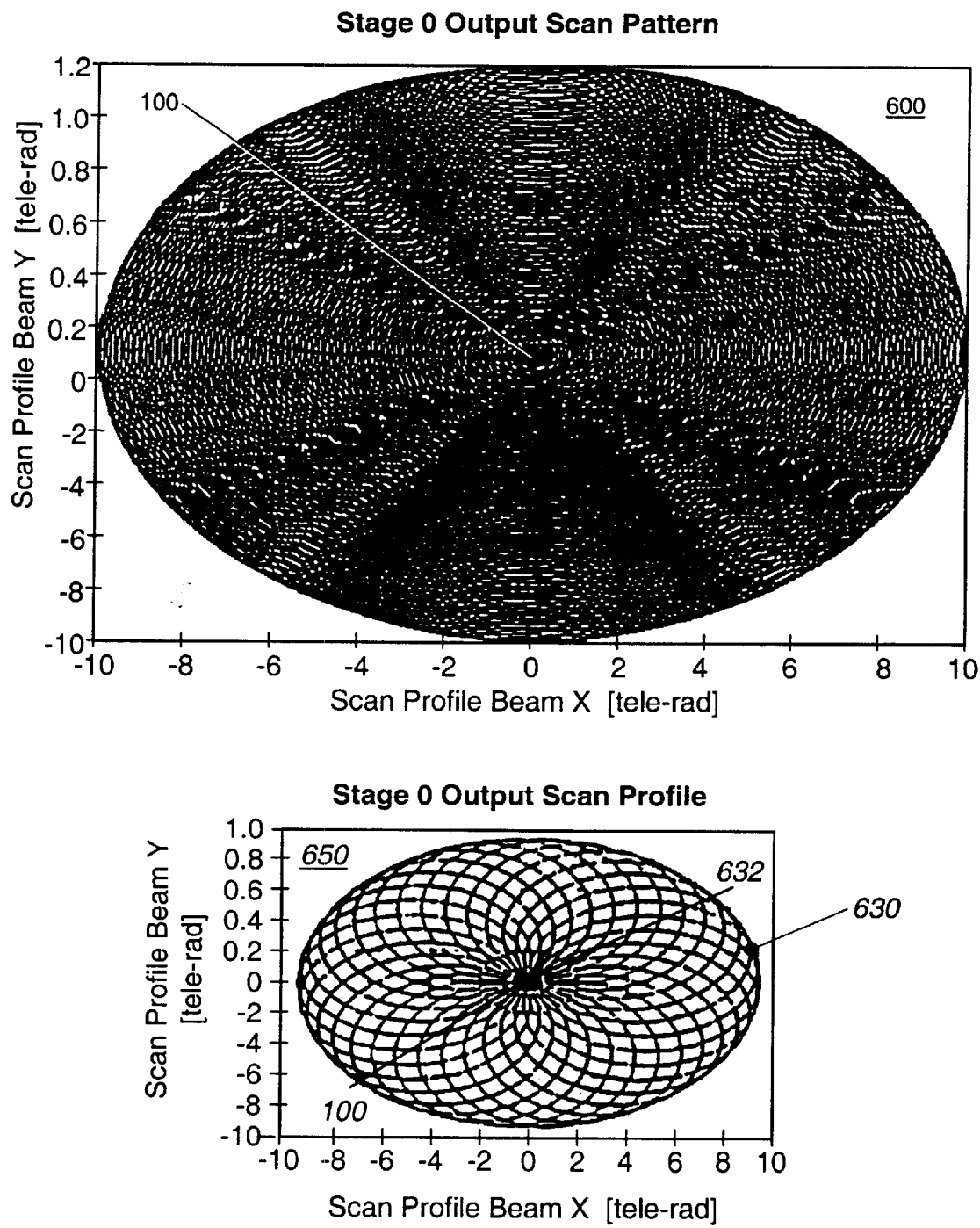
FIG. 16 are diagrams of the spiral and rosette patterns used to transmit a beam by a portion of the apparatus shown in FIG. 4.

As shown in FIG. 16, the starting point of the scan is at the center of uncertainty region RU1 to optimize the time required for acquiring the opposing terminal, since the opposing terminal is less likely to be located at the extremes of the uncertainty region due to the processes that drive the uncertainty estimates of the opposing terminal. Near the center of the scan, where high acceleration would be required by point ahead mechanism 110 to maintain the equivalent areal scan velocity, the spiral scan transitions to a cycloidal pattern that limits the required acceleration to that realizable by the point ahead mechanism 110 while still maintaining coverage of the uncertainty region. The cycloidal pattern occupies the central 40 microradians of the scan. The size of the pattern is dependent on the acceleration characteristics of the point ahead mechanism.

One example of the cycloid pattern is the rosette pattern 650.

Figure 14:
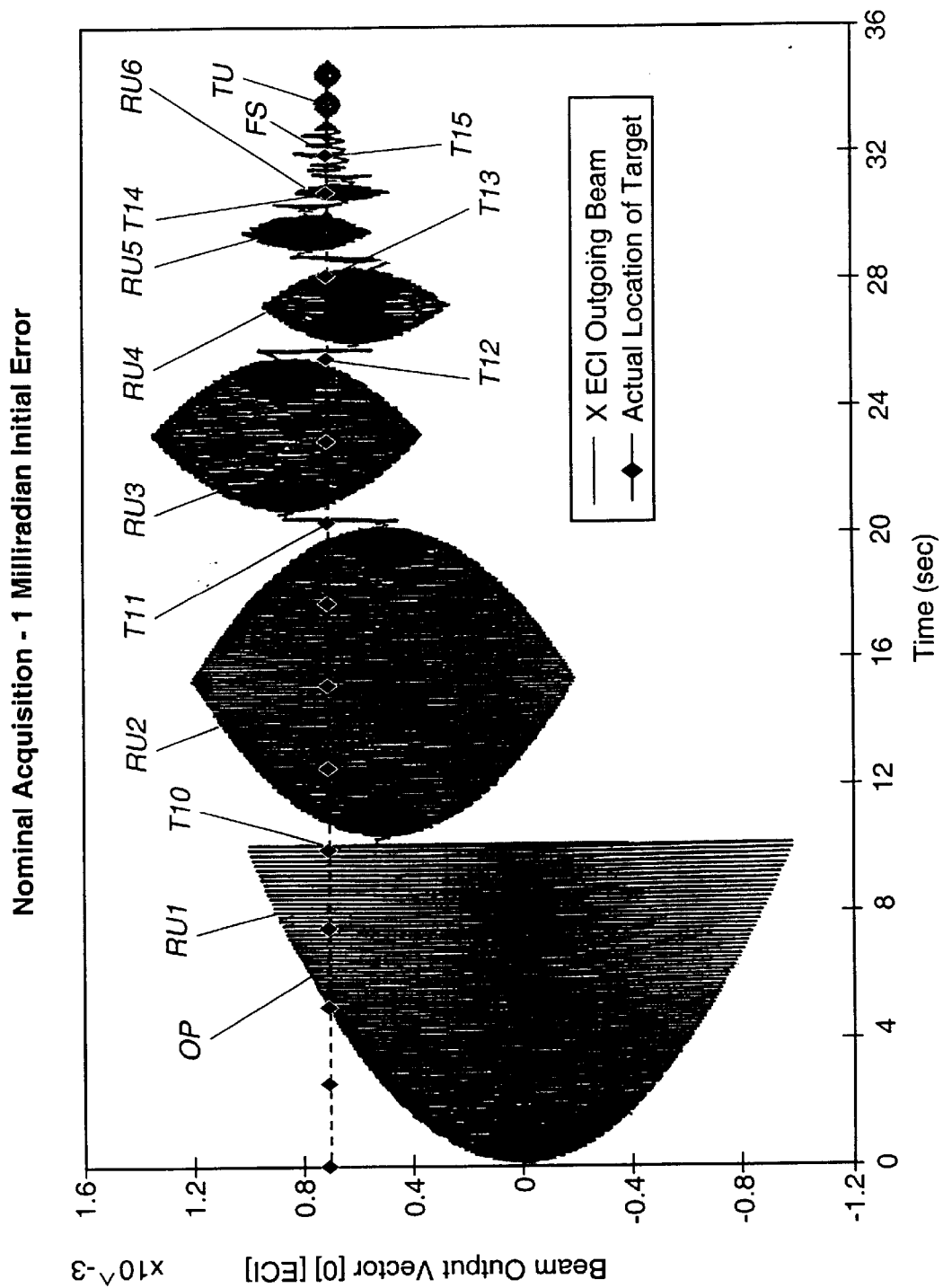
FIG. 14 is a diagram illustrating exemplary output vectors of a beam transmitted by the apparatus shown in FIG. 4 versus time.

After the area of the uncertainty region near the center of the scan has been covered, the rest of the uncertainty region to outer perimeter OP is covered by a spiral scan 600 (FIGS. 14 and 16).

The spiral scan sweeps out the uncertainty region at a constant velocity with a distance between the arms of the spiral set to minimize the time to cover the uncertainty region while maintaining probability of adequately covering the complete region in the presence of terminal based motion due to satellite vehicle disturbances. The velocity is chosen to minimize the time required to cover the uncertainty region while generating a pulse of the appropriate power and time interval as described later.

Both the spiral scan 600 and the cycloid pattern 650 are generated based on the bandwidth of the point ahead mechanism 110 to result in optimized coverage of the uncertainty region. At the perimeter of the uncertainty region OP, the outward spiral transitions to a spiral in an inward direction (FIG. 14), or the spiral can be restarted from the center with the choice made to minimize the overall acquisition time. Whether the scan is being accomplished with the rosette pattern 650 or with the spiral pattern 600, the velocity of the scan is maintained constant.

Figure 17:
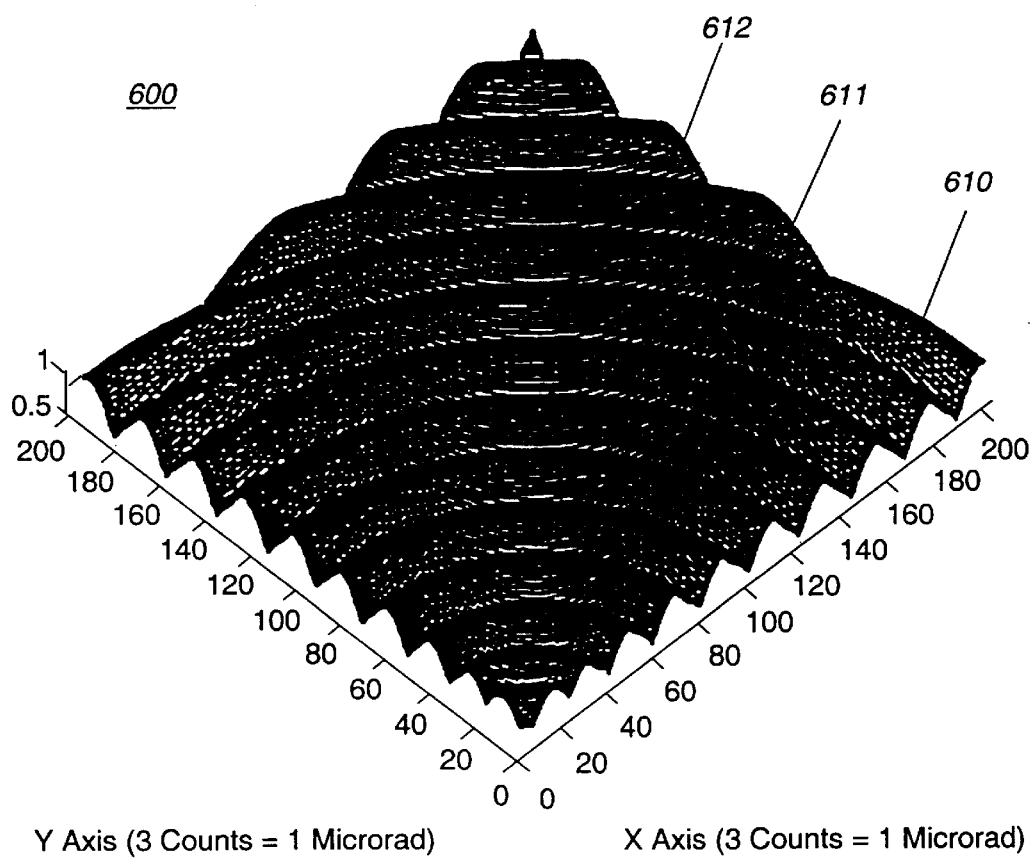
FIG. 17 is an enlarged view of one quadrant of the spiral scan shown in FIG. 16.

FIG. 17 illustrates a normalized intensity distribution for a portion of one quadrant of transmitted beam 17. The spiral convolutions, such as 610–612, overlap slightly as shown in FIG. 17 so that the entire uncertainty region is covered. When the transmit laser source sweeps by the location of the opposing terminal (e.g., when beam 16 sweeps by terminal 12), the near gaussian shape of beam 16, as well as the constant velocity scan, results in a pulse of optical energy with a characteristic time interval and intensity envelope. The electronics of track sensor 80 and acquisition sensor 96 are highly sensitive to pulses of energy with this characteristic time interval and intensity envelope while being relatively insensitive to signals with other characteristics, such as those signals resulting from solar, planetary, and stellar bodies and body motion and internal optical signals and sensor noise. When a signal with the appropriate characteristics is received, and the signal is above the pre-determined power level threshold, acquisition sensor 96 defines the detector quadrant in which the pulse was detected.

When a pulse from beam 16 transmitted by terminal 22 is detected, the acquisition logic can continue down different paths. The first path involves step S12 shown in FIG. 8. Control subassembly 200 includes logic which counts the number of pulses detected by acquisition sensor 96 over time (i.e., the number of times beam 16 enters telescope 14). In step S12, if less than the maximum number of pulses has been detected, the logic moves to step S14 which includes a time allocated for stage expiration. After the time has elapsed, the logic moves onto step S16 which determines whether the minimum number of pulses has been detected and whether the pulses are consistent. If less than a set number of pulses has been detected, the acquisition stage can transition to a previous acquisition stage as indicated by steps S18 and S20, or if in the first acquisition stage, the first stage can be re-tried as indicated in step S22. If the number of first stage re-tries is above a predetermined number, satellite 10 can be notified that the acquisition did not succeed. If more than the minimum number of pulses was detected, but the pulses were not consistent (i.e., the pulses were detected in quadrants on opposing sides of acquisition sensor 96 or in inconsistent quadrants between the acquisition sensor 96 and track sensor 80, indicating that one or more of the pulses was a false detection), the acquisition stage can be re-tried as indicated in step S22. If more than the minimum number of pulses was detected and if the pulses were consistent, the logic can transition to the next acquisition stage as indicated in step S24.

Figure 10:
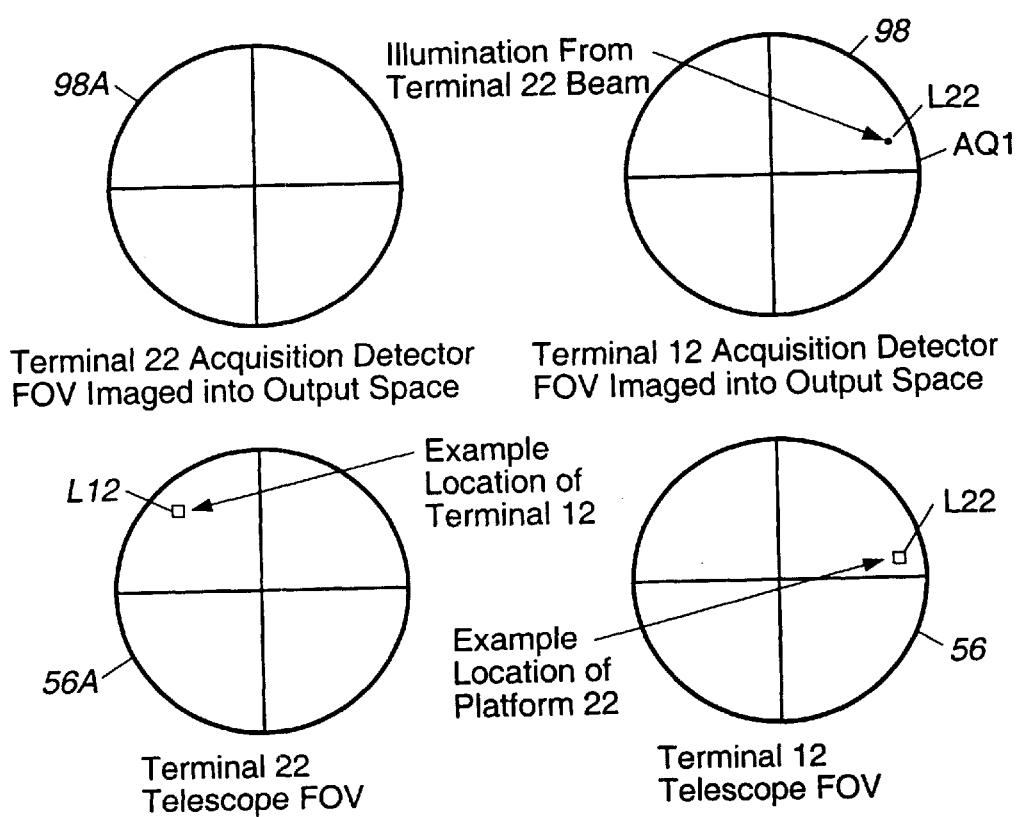

The first acquisition stage is illustrated in FIGS. 9 and 10. The numbers with an A suffix refer to like numbered parts found in terminal 22. FIG. 9 illustrates the field of view 56 of telescope 14 and the field of view 98 of acquisition sensor 96. As shown in FIG. 9, fields of view 56 and 98 are substantially the same size. FIG. 9 also illustrates a field of view 56A with center point 57A of telescope 24 of terminal 22, and a field of view 98A with center point 100A of the acquisition sensor within terminal 22. An exemplary location of terminal 22 within field of view 56 is indicated by L22. An exemplary location of terminal 12 within field of view 56A is indicated by L12.

As shown in FIG. 10, a pulse of receive beam 16 from terminal 22 is detected in quadrant AQ1 of the photo detector of acquisition sensor 96. As a result of this pulse, the position of mirror 64 of fine track mechanism 60 is altered in step S26 (FIG. 8) so that center point 100 of field of view 98 of acquisition sensor 96 is pointed toward the region in space represented by quadrant AQ1 in which the location of terminal 22 was detected. In order to illustrate this point, in FIG. 11, the re-directed field of view 98' with center point 100' of acquisition sensor 96 is superimposed on the original field of view 56 of telescope 14.

The same mode of operation is illustrated in FIG. 14 (in one dimension) which shows the initial region of uncertainty RU1 and the resulting scan of beam 17 by point ahead mechanism 110 in a spiral pattern. The scan pattern defines a spiral locus of scan lines having a center scan line along horizontal axis 0 at the origin of the scan.

The illumination of terminal 12 by beam 16 illustrated in FIG. 10 occurs at some time prior to the stage completion, T10 shown in FIG. 14. At time T10, the initial region of uncertainty RU1 is reduced to a second region of uncertainty RU2 also illustrated by new scan field of view SC2 (FIGS. 11 and 12). Point ahead mechanism 110 and fine track mechanism 60 point the center line of the scan into region RU2 as determined by the pulse detected in detector quadrant AQ1. Point ahead mechanism 110 begins to scan transmit beam 17 in region RU2 beginning at center point 100'. As shown in FIG. 14, uncertainty region RU2 is smaller than uncertainty region RU1. The scanning of transmit beam 17 in region RU2 is the same as the scanning previously described-in region RU1, except that the diameter of the region is smaller.

Referring again to FIG. 8, if step S20 results in a decrease in the stage, then in step S28 the field of view 98 for the preceding stage is altered in a manner which reverses the order of FIGS. 10 and 11.

As shown in FIG. 12, telescope 14 is reoriented using unloading loop 340 (FIG. 7) so that center point 57 of field of view 56 again is aligned with the new field of view of acquisition sensor 96. That is, center points 57, 84, 91 and 100 are aligned.

To summarize the transition of operation from the initial stage to the next stage, the estimate of the opposing terminal location (e.g., L22, FIGS. 9–12), the uncertainty region and the scan pattern are adjusted. When a pulse from terminal 22 is detected by terminal 12 on a particular quadrant (e.g., quadrant AQ1), this means that terminal 22 is located within the intersection of uncertainty region RU1 and quadrant AQ1. The new uncertainty region RU2 (FIG. 14) is taken to be this intersection. The estimated location of terminal 22 is taken to be the center of the new uncertainty region RU2. The radius of the scan pattern is adjusted to encompass the new uncertainty region RU2, and the center point 100 of the acquisition sensor field of view 98 and then the center point 57 of the telescope field of view 56 are pointed at the center of the new uncertainty region RU2.

Fine track mechanism 60 is used to point center point 100 of the acquisition sensor 96 toward the region of space indicated by the detector quadrant (e.g., quadrant AQ1) in which a pulse is detected. The acquisition logic delays the pointing of the center point of the field of view of the acquisition sensor to account for light travel time between terminals 12 and 22 and to allow fine track mechanism 60 to settle on the new location.

Point ahead mechanism 110 is committed to follow the new scan pattern so that the center point of the spiral scan of beam 17 and center point 100 are aligned. Telescope 14 then follows the movement of point ahead mechanism 110 so that center points 57 and 100 again are aligned. Point ahead mechanism 110 then begins the previously described scan pattern for transmit beam 17.

The result of the transition to the new acquisition stage is that the estimate of the opposing terminal position, (e.g., terminal 22) is improved and the uncertainty region is reduced. Due to the reduced uncertainty region, it takes less time for the scan pattern to be completed resulting in an increasing pulse rate detected by acquisition sensor at the opposing terminal. Thus, each acquisition stage takes less time to complete than the previous acquisition stage.

The number of acquisition stages required is dependent on the size of the initial uncertainty region. After transition through a number of acquisitions stages, the remaining uncertainty and the estimate of the opposing terminal location is less than beam diameter or area. This uncertainty region is sufficient to enable-tracking sensor 80 to continuously track beam 16 from terminal 22.

FIG. 14 illustrates acquisition stages involving uncertainty regions RU1-RU6 which terminate at times T10–T15, respectively, when a pulse from beam 16 is detected by acquisition sensor 96. Each of uncertainty regions RU1-RU6 is smaller than the previous regions. The transaction from one region to the next can be understood from the description of the transition from region RU1 to RU2. Thus, the size of regions RU1-RU6 successively approaches the size of region TU at which tracking can commence.

The final stages of acquisition, illustrated by uncertainty region FS in FIG. 14, drop the spiral scan described previously in favor of a modified cycloid scan pattern.like pattern 650 shown in FIG. 16. Such patterns are designed to sweep the transmit laser beam across the opposing terminal position a smaller number of times at the edge of the scan pattern 630 as opposed to the central portion of the scan pattern 632. At the opposing terminal, this operation results in a lower pulse rate at the edge of the uncertainty region 630 and a higher pulse rate at the center of the uncertainty region 632.

During the final stages of acquisition, the acquisition logic is modified to move the estimate of the opposing terminal position, and therefore the center point 84 of track sensor 80, a fixed amount in the direction appropriate for the quadrant of track sensor 80 in which the most recent pulse of beam 16 was detected.

Since the effect of a false detection is less critical during the final stages of acquisition, the power level at which the pulses are detected can be adjusted to minimize overall acquisition time. The threshold is adjusted in the circuitry for acquisition sensor 96.

A transition to a previous acquisition stage occurs if less than the predetermined average number of pulses per second are received or if a stage time has been exceeded. This indicates that the opposing terminal has a larger uncertainty region and therefore needs more time to improve its estimate of the current terminal location. The stage times account for light travel time and are selected to minimize the possibility that the two terminals (e.g., terminals 12 and 22) will cycle back and forth between stages by adding a random time interval to each stage time. If greater than a specific average number of pulses is received, the terminal transitions to the next acquisition stage in a smaller cycloidal pattern that results in a higher detection pulse rate at the opposing terminal.

At the final cycloidal acquisition stage, illustrated by uncertainty region TU in FIG. 14, when the average pulse rate exceeds a predetermined threshold, the cycloidal pattern is removed from the commands sent to the point ahead mechanisms (e.g., point ahead mechanism 110) resulting in a constant power beam on the opposing terminal track sensor (e.g., track sensor 80). On the opposing terminal, the second set of track sensor electronics uses this constant power beam to generate track error signals that are used to further correct the opposing terminal tracking. Acquisition is completed when the second set of track electronics on both terminals indicate the reception of sufficient signal power to maintain tracking. If after a predetermined stage time, the second set of track electronics does not indicate sufficient signal power, the acquisition logic drops back to the previous cycloidal acquisition stage for that terminal. The stage times account for light travel time and are selected to minimize the possibility that the two terminals cycle back and forth between stages by adding a random time interval to each stage time.

Referring to FIG. 8, the previously described final stages of acquisition are entered through step S32. Since the final stages of acquisition preferably are not timed, the logic proceeds to step S34 in which terminal 12 calculates a real time update and applies it to the estimate for terminal 22. The logic then proceeds to step S36 in which circuitry calculates.the average rate at which beam 16 is striking terminal 12. If the strike or hit rate is above a predetermined threshold, step S40 transfers the logic to step S42 which determines whether the hit rate is sufficient to enter the tracking stage at step S44. If the hit rate is insufficient, the logic proceeds to step S46 in which the region of uncertainty stage is increased by 1 and the estimate of the opposing terminal position is modified by a predetermined amount.

Returning to step S40, if the hit rate is not above the go forward threshold, then the logic proceeds to step S48 to determine whether the hit rate is below the go back threshold which requires a decrease in the stage. If the hit rate is below the threshold, then the stage is decreased by 1, and the adjustment of the opposing terminal position estimate is also decreased so that the region of uncertainty is enlarged by a predetermined.amount in step S50.

Returning to step S48, if the hit rate is not below the return threshold, then the current stage is continued in step S52.

Figure 15:
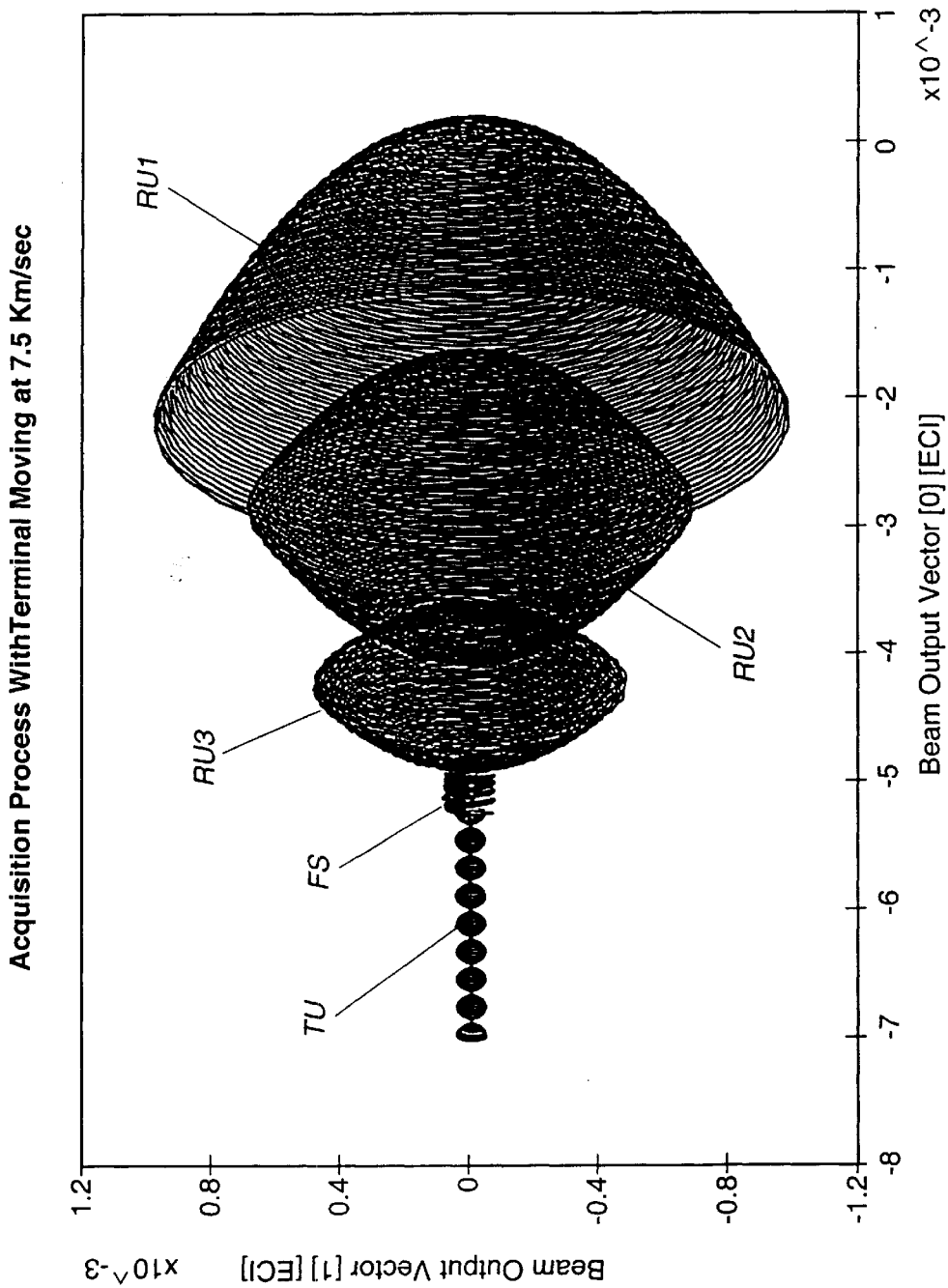
FIG. 15 is a diagram illustrating exemplary output vectors of a beam transmitted by the apparatus shown in FIG. 4 during an exemplary acquisition process with one of the terminals shown in FIG. 1 moving at 7.5 kilometers per second.

A comparison of FIGS. 14 and 15 shows that the number of stages can vary depending on the circumstances, such as the size of the initial region of uncertainty RU1. As shown in FIG. 14, there are six progressively smaller regions of uncertainty before terminal 12 enters the final stages of acquisition FS through steps S32 and S34 (FIG. 8). When the tracking stage is entered at step S44, the region of uncertainty is the tracking region of uncertainty TU shown in FIGS. 14 and 15 in which the uncertainty region is less than the diameter or area of the received beam width. FIG. 15 illustrates an acquisition in which only three regions of uncertainty (RU1–RU3) are successively entered before the final stage FS is entered.

Figure 13:
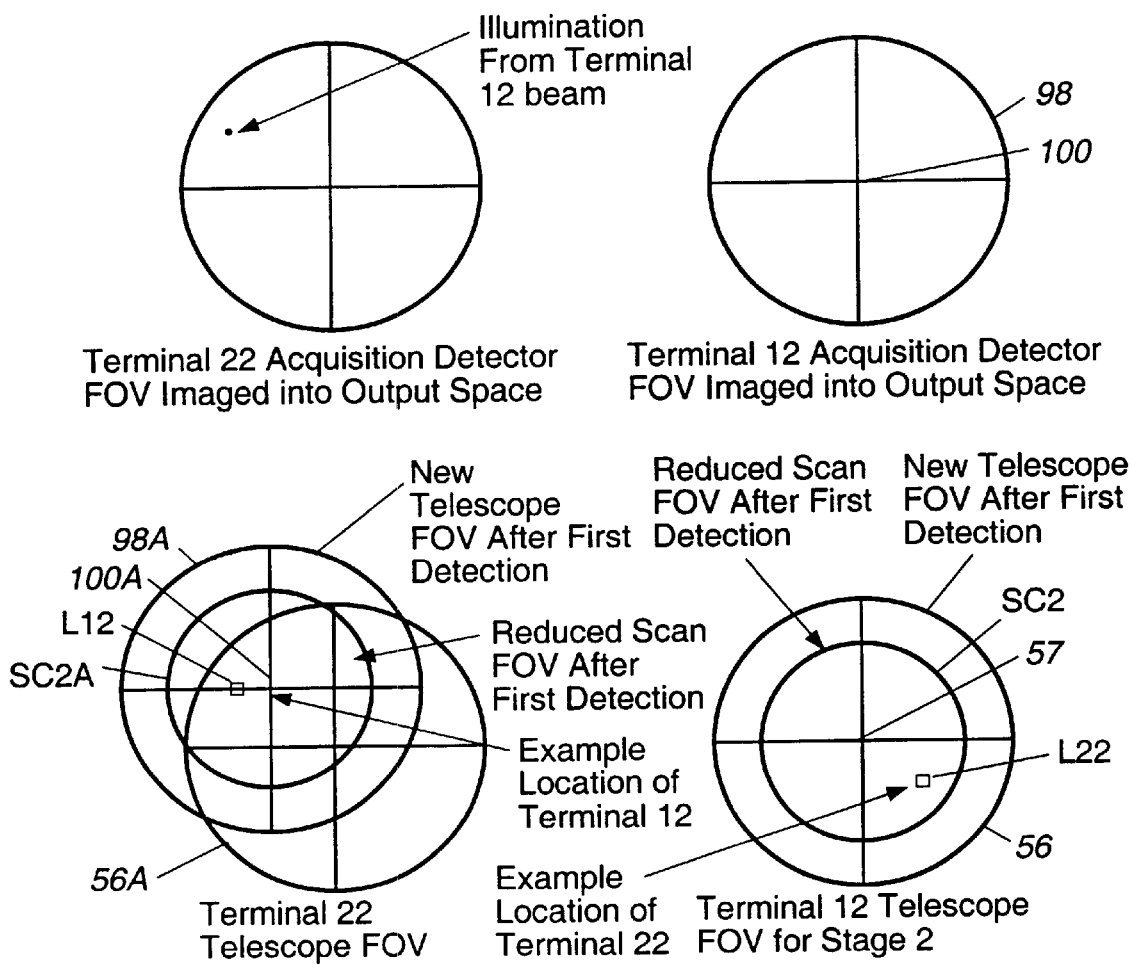

While terminal 12 is being aligned with beam 16, terminal 22 simultaneously is being aligned with beam 17 in the same manner. FIG. 13 illustrates the change in pointing of the center point of the field of view of the acquisition sensor on terminal 22 when transmit beam 17 strikes that terminal. The portions of the field of views defined in terminal 22 are identified by like numbers used in connection with the terminal 12 apparatus, but are given the suffix "A." As a result, the operation in terminal 22 can be understood from the preceding discussion of the operation in terminal 12 provided in connection with FIGS. 11 and 12. More specifically, as shown in FIG. 13, the re-directed field of view 98' with center point 100A' of acquisition sensor 96A is superimposed on the original field of view 56A of telescope 24.

If during the tracking mode of operation, the signal power drops below that required for tracking, terminal 12 automatically transitions to the final stage of the acquisition logic and follows the acquisition logic either to notification that the acquisition and therefore the link has failed or that the track has been re-established. This results in robust performance and minimizes the impacts of interruptions in the link between the terminals.

Those skilled in the art will recognize that the preferred embodiments may be altered and modified without departing from the true spirit and scope of the invention as defined in the accompanying claims.

What is claimed is:

1. In a communication system employing an optical beam suitable for transmission of data between a first terminal located on an earth orbiting satellite and a second terminal remote from the first terminal, apparatus for aligning the beam received from the second terminal with a beam receptor located on the first terminal within a first uncertainty region which allows tracking of the beam with sufficient accuracy to enable communication of data with the optical beam, said apparatus comprising in combination:

optics operable to receive the beam and to transmit the beam along a path;

a positioning mechanism capable of pointing the optics to the location of the second terminal within a second uncertainty region larger than the first uncertainty region;

an acquisition sensor connected to receive at least a portion of the beam and to locate the second terminal within a third uncertainty region larger than the first uncertainty region and smaller than the second uncertainty region; and a controller responsive to the locating of the second terminal to cause the positioning mechanism to move at least a portion of the optics to successively adjust the position of the beam path relative to the acquisition sensor whereby the size of the third uncertainty region successively approaches the size of the first uncertainty region to facilitate the commencement of tracking of the beam.

2. Apparatus, as claimed in claim 1, wherein the beam is a diffraction limited beam.

3. Apparatus, as claimed in claim 1, wherein the acquisition sensor defines an optical center point, wherein the third uncertainty region defines a locus of ray lines focused on a portion of the acquisition sensor and wherein the optics successively directs at least one of the ray lines in the locus toward the center point.

4. Apparatus, as claimed in claim 1, wherein the acquisition sensor comprises a quadrant detector.

5. Apparatus, as claimed in claim 1, wherein the optics comprises:

a telescope; and a movable tracking mirror; and wherein the positioning mechanism comprises a motor controlled by the controller and coupled to the tracking mirror.

6. Apparatus, as claimed in claim 1, and further comprising a coupling mirror defining a hole, said coupling mirror directing a first portion of the beam to the acquisition sensor and directing a second portion of the beam passing through the hole to the beam receptor.

7. Apparatus, as claimed in claim 6, wherein the optics comprises at least one lens focusing the first portion of the beam onto the acquisition sensor.

8. In a communication system employing a optical beam suitable for transmission of data between a first terminal located on an earth orbiting satellite and a second terminal remote from the first terminal, apparatus for aligning the beam received from the second terminal with a beam receptor located on the first terminal to enable tracking of the beam with sufficient accuracy to enable communication of data with the beam, said apparatus comprising in combination:

optics arranged to receive the beam and to define a first field of view with a first center point;

a positioning mechanism arranged to point the optics in the direction of the second terminal;

an acquisition sensor connected to define a second field of view with a second center point receiving at least a portion of the beam and to locate the second terminal within a portion of the first field of view; and a controller responsive to the locating of the second terminal by the acquisition sensor to control the positioning mechanism successively to point the first and second center points toward a region represented by the portion of the first field of view in which the second terminal is determined to be located until at least a portion of the beam is sufficiently aligned with the beam receptor to enable tracking.

9. Apparatus, as claimed in claim 8, wherein the beam is a diffraction limited beam.

10. Apparatus, as claimed in claim 8, wherein the first field of view is larger than the second field of view.

11. Apparatus, as claimed in claim 8, wherein the positioning mechanism aligns the first center point with the second center point.

12. Apparatus, as claimed in claim 8, and further comprising a tracking sensor connected to receive at least a portion of the beam and to define a third field of view with a third center point and wherein the controller is responsive to the locating of the second terminal by the acquisition sensor to control the positioning mechanism successively to point the first, second and third center points toward the portion of the field of view in which the second terminal is located until the location of the second terminal lies within the third field of view.

13. Apparatus, as claimed in claim 12, wherein the first field of view is larger than the second field of view and wherein the second field of view is larger than the third field of view.

14. Apparatus, as claimed in claim 12, wherein the second and third center points are substantially aligned and wherein the positioning mechanism aligns the first center point with the second and third centers points so that the first, second and third center points are substantially aligned.

15. Apparatus, as claimed in claim 13, wherein the acquisition sensor comprises a quadrant detector.

16. Apparatus, as claimed in claim 8, wherein the optics comprises:
 a telescope; and
 a tracking mirror capable of moving the second third fields of view; and
 wherein the positioning mechanism comprises a motor controlled by the controller and coupled to the tracking mirror.

17. Apparatus, as claimed in claim 8, and further comprising a coupling mirror defining a hole, said coupling mirror directing a first portion of the beam to the acquisition sensor and directing a second portion of the beam passing through the hole to the beam receptor.

18. Apparatus, as claimed in claim 17, wherein the optics further comprises at least one lens focusing the first portion of the beam onto the acquisition sensor.

19. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning the second beam transmitted by the second terminal with a first beam receptor located on the first terminal within a first uncertainty region which allows tracking of the second beam with sufficient accuracy to enable communication of data with the second beam, said apparatus comprising in combination:
 optics in the first terminal arranged to enable transmission of the first beam and receipt of the second beam, the optics comprising a beam deflector movable to scan the first beam over a controlled second uncertainty region with a first scan pattern defining a first locus of scan lines having a center scan line;
 a positioning mechanism arranged to point the optics toward the location of the second terminal and moving the beam deflector;
 an acquisition sensor in the first terminal connected to receive at least a portion of the second beam and to determine the location of the second terminal within a third uncertainty region; and
 a controller in the first terminal connected to successively control the positioning mechanism in response to the location determined by the acquisition sensor to cause the beam deflector successively to point the center scan line into the third uncertainty region to facilitate the commencement of tracking.

20. Apparatus, as claimed in claim 19, wherein the first and second optical beams are diffraction limited beams.

21. Apparatus, as claimed in claim 19, wherein the controller successively reduces the size of the second uncertainty region in accordance with the determined size of the third uncertainty region.

22. Apparatus, as claimed in claim 19, wherein the controller enables the second uncertainty region to be larger than the third uncertainty region and then successively enables the size of the third uncertainty region to be reduced to the size of the first uncertainty region.

23. Apparatus, as claimed in claim 19, wherein the optics transmit the first and second beams in the first terminal at least in part along a common path.

24. Apparatus, as claimed in claim 19, wherein the first scan pattern comprises a spiral.

25. Apparatus, as claimed in claim 19, wherein the controller causes the first scan pattern to comprise a spiral until the second uncertainty region is reduced to a predetermined size and then causes the scan pattern to comprise a modified cycloid.

26. Apparatus, as claimed in claim 19, wherein the acquisition sensor comprises a quadrant detector.

27. Apparatus, as claimed in claim 19, wherein the optics comprises:
 a telescope; and
 a point ahead mirror capable of moving the beam deflector; and
 wherein the positioning mechanism comprises a motor controlled by the controller and coupled to the point ahead mirror.

28. Apparatus, as claimed in claim 19, and further comprising a coupling mirror defining a hole which directs a first portion of the first beam to the acquisition sensor and directs a second portion of the first beam passing through the hole to the first beam receptor.

29. Apparatus, as claimed in claim 28, wherein the optics comprises at least one lens focusing the first portion of the first beam onto the acquisition sensor.

30. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning the second beam transmitted by the second terminal with a first beam receptor located on the first terminal to enable tracking of the second beam with sufficient accuracy to enable communication of data with the second beam, said apparatus comprising in combination:
 optics in the first terminal arranged to define a first field of view having a first center point enabling receipt of the second beam, the optics comprising a beam deflector movable to scan the first beam over a second field of view having a second center point within the first field of view;
 a positioning mechanism movable to point the optics toward the location of the second terminal and moving the beam deflector;
 an acquisition sensor arranged to define a third field of view with a third center point in the first terminal receiving at least a portion of the second beam and to determine the location of the second terminal within a portion of the third field of view; and a controller in the first terminal connected to successively control the positioning mechanism in response to the location determined by the acquisition sensor to cause the positioning mechanism successively to point the first and second center points toward a region represented by the portion of the third field of view in which the second terminal is located to facilitate the commencement of tracking.

31. Apparatus, as claimed in claim 30, wherein the first and second optical beams are diffraction limited beams.

32. Apparatus, as claimed in claim 30, wherein the first field of view is larger than the second field of view.

33. Apparatus, as claimed in claim 30, wherein the positioning mechanism aligns the first center point with the second center point.

34. Apparatus, as claimed in claim 30, and further comprising a tracking sensor in the first terminal arranged to receive at least a portion of the second beam and to define a fourth field of view with a fourth center point and wherein the controller is responsive to the locating of the second terminal by the acquisition sensor to control the positioning mechanism successively to point the first, second, third and fourth center points toward the portion of the third field of view in which the second terminal is located until the location of the second terminal lies within the fourth field of view.

35. Apparatus, as claimed in claim 34, wherein the first field of view is larger than the second field of view and wherein the third field of view is larger than the fourth field of view.

36. Apparatus, as claimed in claim 34, wherein the third and fourth center points are substantially aligned and wherein the positioning mechanism aligns the first and second center points with the third and fourth center points so that first, second, third and fourth center points are substantially aligned.

37. Apparatus, as claimed in claim 30, wherein the scan of the first beam defines a spiral scan pattern.

38. Apparatus, as claimed in claim 37, wherein the controller causes the first scan pattern to comprise a spiral until the second uncertainty region is reduced to a predetermined size and then causes the scan pattern to comprise a modified cycloid.

39. Apparatus, as claimed in claim 30, wherein the acquisition sensor comprises a quadrant detector.

40. Apparatus, as claimed in claim 30, wherein the optics comprises:
   a telescope; and
   a point ahead mirror scanning the first beam; and
   wherein the positioning mechanism comprises a motor controlled by the controller and coupled to the point ahead mirror.

41. Apparatus, as claimed in claim 30, and further comprising a coupling mirror defining a hole which directs a first portion of the first beam to the acquisition sensor and directs a second portion of the first beam passing through the hole to the first beam receptor.

42. Apparatus, as claimed in claim 41, wherein the optics comprises at least one lens focusing the first portion of the first beam onto the acquisition sensor.

43. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning and tracking the second beam transmitted by the second terminal with a first beam receptor located on the first terminal with sufficient accuracy to enable communication of data with the second beam, said apparatus comprising in combination:

a telescope in the first terminal arranged to transmit the first beam and receive the second beam at least in part along a common first path, said telescope defining a first field of view;

a movable first beam deflector arranged to transmit the first beam to the first path and to receive the second beam from the first path;

a first beam splitter arranged to direct the first beam from a transmission path onto the first beam deflector and to direct the second beam into a receive path;

a track sensor arranged to define a second field of view;

a second beam splitter in the receive path arranged to direct a predetermined percentage of the beam in the receive path along a track sensor path to the track sensor;

an acquisition sensor arranged to define a third field of view;

a second beam deflector arranged to deflect part of the beam in the receive path along an acquisition sensor path to the acquisition sensor and part of the beam in the receive path onto the first beam receptor;

first transmission optics arranged to transmit the first beam along the transmission path;

a third beam deflector movable to scan the first beam in a predetermined scan pattern along the transmission path and to transmit the scan pattern to the first beam splitter; and a controller connected to alter the position of the first beam deflector to adjust the second field of view relative to the track sensor and to adjust the third field of view relative to the acquisition sensor and to alter the position of the third beam deflector to adjust the scan pattern to enable tracking to begin.

44. Apparatus, as claimed in claim 43, wherein the first beam receptor comprises an optical fiber.

45. Apparatus, as claimed in claim 43, wherein the acquisition sensor comprises a quadrant detector and wherein the controller comprises a motor moving the first beam deflector so that the center of third field of view is pointed toward the quadrant of the third field of view detected by the acquisition sensor.

46. Apparatus, as claimed in claim 43, and further comprising first focusing optics in the track sensor path focusing the beam in the track sensor path onto the track sensor and second focusing optics in the acquisition sensor path focusing the beam in the acquisition sensor path onto the acquisition sensor.

47. Apparatus, as claimed in claim 43, therein the track sensor comprises a quadrant detector.

48. Apparatus, as claimed in claim 43, wherein the telescope comprises an assembly of mirrors.

49. Apparatus, as claimed in claim 43, wherein the first beam deflector and second beam deflector each comprises a movable mirror.

50. Apparatus, as claimed in claim 43, wherein the first beam splitter comprises dichroic material.

51. Apparatus, as claimed in claim 43, wherein the first transmission optics comprises one or more collimating lenses.

52. Apparatus, as claimed in claim 43, wherein the second beam deflector comprises a second mirror defining a hole and enabling the beam passed into the receive path by the first beam deflector to either be focused on the acquisition sensor or to be passed through the hole to the first beam receptor.

53. Apparatus, as claimed in claim 52, wherein the second mirror has a generally annular shape.

54. Apparatus, as claimed in claim 43, wherein the second beam splitter enables about 10 percent of the beam in the receive path to be focused on the track sensor.

55. In a communication system employing an optical beam suitable for transmission of data between a first terminal located on an earth orbiting satellite and a second terminal remote from the first terminal, apparatus for aligning the beam received from the second terminal with a beam receptor located on the first terminal within a first uncertainty region which allows tracking of the beam with sufficient accuracy to enable communication of data with the optical beam, said apparatus comprising in combination:

optics means for enabling receipt of the beam and transmission of the beam along a path;

positioning means for pointing the optics to the location of the transmitter within a second uncertainty region larger than the first uncertainty region;

acquisition sensor means for receiving at least a portion of the beam and locating the second terminal within a third uncertainty region larger than the first uncertainty region and smaller than the second uncertainty region; and controller means responsive to the locating of the second terminal for causing the positioning means to move at least a portion of the optics means to successively adjust the position of the beam path relative to the acquisition sensor means whereby the size of the third uncertainty region successively approaches the size of the first uncertainty region to facilitate the commencement of tracking of the beam.

56. Apparatus, as claimed in claim 55, wherein the beam is a diffraction limited beam.

57. Apparatus, as claim 55 wherein the acquisition sensor means defines an optical center point, wherein the third uncertainty region defines a locus of ray lines focused on a portion of the acquisition sensor means and wherein the optics means successively directs at least one of the ray lines in the locus toward the center point.

58. Apparatus, as claimed in claim 55, wherein the acquisition sensor means comprises a quadrant detector.

59. Apparatus, as claimed in claim 55, wherein the optics means comprises:

a telescope; and a movable tracking mirror; and wherein the positioning means comprises a motor controlled by the controller means and coupled to the tracking mirror.

60. Apparatus, as claimed in claim 55, and further comprising a coupling mirror defining a hole, said coupling mirror directing a first portion of the beam to the acquisition sensor means and directing a second portion of the beam passing through the hole to the beam receptor.

61. Apparatus, as claimed in claim 60, wherein the optics comprises at least one lens focusing the first portion of the beam onto the acquisition sensor means.

62. In a communication system employing a optical beam suitable for transmission of data between a first terminal located on an earth orbiting satellite and a second terminal remote from the first terminal, apparatus for aligning the beam received from the second terminal with a beam receptor located on the first terminal to enable tracking of the beam with sufficient accuracy to enable communication of data with the beam, said apparatus comprising in combination:

optics means for receiving the beam and for defining a first field of view with a first center point;

positioning means for pointing the optics in the direction of the first terminal;

acquisition sensor means for defining a second field of view with a second center point receiving at least a portion of the beam and for locating the second terminal within a portion of the first field of view; and controller means responsive to the locating of the second terminal by the acquisition sensor for controlling the positioning means successively to point the first and second center points toward a region represented by the portion of the first field of view in which the second terminal is located until at least a portion of the beam is sufficiently aligned with the beam receptor to enable tracking.

63. Apparatus, as claimed in claim 62, wherein the beam is a diffraction limited beam.

64. Apparatus, as claimed in claim 62, wherein the first field of view is larger than the second field of view.

65. Apparatus, as claimed in claim 62, wherein the positioning means aligns the first center point with the second center point.

66. Apparatus, as claimed in claim 62, and further comprising tracking sensor means receiving at least a portion of the beam and defining a third field of view with a third center point and wherein the controller means is responsive to the locating of the second terminal by the acquisition sensor means to control the positioning means successively to point the first, second and third center points toward the portion of the field of view in which the second terminal is located until the location of the second terminal lies within the third field of view.

67. Apparatus, as claimed in claim 66, wherein the first field of view is larger than the second field of view and wherein the second field of view is larger than the third field of view.

68. Apparatus, as claimed in claim 66, wherein the second and third center points are substantially aligned and wherein the positioning means aligns the first center point with the second and third centers points so that the first, second and third center points are substantially aligned.

69. Apparatus, as claimed in claim 62, wherein the acquisition sensor means comprises a quadrant detector.

70. Apparatus, as claimed in claim 62, wherein the optics comprises:

a telescope; and a tracking mirror capable of moving the second and third fields of view; and wherein the positioning means comprises a motor controlled by the controller means and coupled to the tracking mirror.

71. Apparatus, as claimed in claim 62, and further comprising a coupling mirror defining a hole, said coupling mirror directing a first portion of the beam to the acquisition sensor and directing a second portion of the beam passing through the hole to the beam receptor.

72. Apparatus, as claimed in claim 71, wherein the optics means further comprises at least one lens focusing the first portion of the beam onto the acquisition sensor means.

73. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning the second beam transmitted by the second terminal with a first beam receptor located on the first terminal within a first uncertainty region which allows tracking of the second beam with sufficient accuracy to enable communication of data with the second beam, said apparatus comprising in combination:

optics means in the first terminal for enabling transmission of the first beam and receipt of the second beam, the optics means comprising beam deflector means for scanning the first beam over a controlled second uncertainty region with a first scan pattern defining a first locus of scan lines having a center scan line;

positioning means for pointing the optics means toward the location of the second terminal and for moving the beam deflector means;

acquisition sensor means in the first terminal for receiving at least a portion of the second beam and for determining the location of the second terminal within a third uncertainty region; and controller means in the first terminal for controlling successively the positioning means in response to the location determined by the acquisition sensor means to cause the beam deflector means successively to point the center scan line into the third uncertainty region to facilitate the commencement of tracking.

74. Apparatus, as claimed in claim 73, wherein the first and second optical beams are diffraction limited beams.

75. Apparatus, as claimed in claim 73, wherein the controller means successively reduces the size of the second uncertainty region in accordance with the determined size of the third uncertainty region.

76. Apparatus, as claimed in claim 73, wherein the controller means enables the second uncertainty region to be larger than the third uncertainty region and then successively enables the size of the third uncertainty region to be reduced to the size of the first uncertainty region.

77. Apparatus, as claimed in claim 73, wherein the optics means comprises means for transmitting the first and second beams in the first terminal at least in part along a common path.

78. Apparatus, as claimed in claim 73, wherein the first scan pattern comprises a spiral.

79. Apparatus as claimed in claim 73, wherein the controller means comprises means for causing the first scan pattern to comprise a spiral until the second uncertainty region is reduced to a predetermined size and then for causing the scan pattern to comprise a modified cycloid.

80. Apparatus, as claimed in claim 73, wherein the acquisition sensor means comprises a quadrant detector.

81. Apparatus, as claimed in claim 73, wherein the optics means comprises:

a telescope; and a point ahead mirror capable of moving the beam deflector; and wherein the positioning means comprises a motor controlled by the controller means and coupled to the point ahead mirror.

82. Apparatus, as claimed in claim 73, and further comprising a coupling mirror defining a hole which directs a first portion of the first beam to the acquisition sensor means and which directs a second portion of the first beam passing through the hole to the first beam receptor.

83. Apparatus, as claimed in claim 82, wherein the optics means comprises at least one lens focusing the first portion of the first beam onto the acquisition sensor.

84. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning the second beam transmitted by the second terminal with a first beam receptor located on the first terminal to enable tracking of the second beam with sufficient accuracy to enable communication of data with the second beam, said apparatus comprising in combination:

optics means in the first terminal defining a first field of view having a first center point enabling receipt of the second beam, the optics means comprising beam deflector means for scanning the first beam over a second field of view having a second center point within the first field of view;

positioning means for pointing the optics toward the location of the second terminal and moving the beam deflector;

acquisition sensor means for defining a third field of view with a third center point in the first terminal receiving at least a portion of the second beam and for determining the location of the second terminal within a portion of the third field of view; and controller means in the first terminal for controlling successively the positioning means in response to the location determined by the acquisition sensor means to cause the positioning means successively to point the first and second center points toward a region represented by the portion of the third field of view in which the second terminal is located to facilitate the commencement of tracking.

85. Apparatus, as claimed in claim 84, wherein the first and second optical beams are diffraction limited beams.

86. Apparatus, as claimed in claim 84, wherein the first field of view is larger than the second field of view.

87. Apparatus, as claimed in claim 84, wherein the positioning means aligns the first center point with the second center point.

88. Apparatus, as claimed in claim 84, and further comprising tracking sensor means in the first terminal for receiving at least a portion of the second beam and for defining a fourth field of view with a fourth center point and wherein the controller means comprises means responsive to the locating of the second terminal by the acquisition sensor for controlling the positioning means successively to point the first, second, third and fourth center points toward the portion of the third field of view in which the second terminal is located until the location of the second terminal lies within the fourth field of view.

89. Apparatus, as claimed in claim 88, wherein the first field of view is larger than the second field of view and wherein the third field of view is larger than the fourth field of view.

90. Apparatus, as claimed in claim 88, wherein the third and fourth center points are substantially aligned and wherein the positioning means aligns the first and second center points with the third and fourth center points so that first, second, third and fourth center points are substantially aligned.

91. Apparatus, as claimed in claim 84, wherein the scanning of the first beam defines a spiral scan pattern.

92. Apparatus, as claimed in claim 91, wherein the controller means comprises means for causing the first scan pattern to comprise a spiral until the second uncertainty region is reduced to a predetermined size and then for causing the scan pattern to comprise a modified cycloid.

93. Apparatus, as claimed in claim 84, wherein the acquisition sensor means comprises a quadrant detector.

94. Apparatus, as claimed in claim 84, wherein the optics means comprises:
   a telescope; and
   a point ahead mirror capable of scanning the first beam; and
   wherein the positioning means comprises a motor controlled by the controller means and coupled to the point ahead mirror.

95. Apparatus, as claimed in claim 84, and further comprising a coupling mirror defining a hole which directs a first portion of the first beam to the acquisition sensor means and which directs a second portion of the first beam passing through the hole to the first beam receptor.

96. Apparatus, as claimed in claim 95, wherein the optics means comprises at least one lens focusing the first portion of the first beam onto the acquisition sensor.

97. In a communication system employing a first optical beam and a second optical beam suitable for transmission of data between a first terminal located on an earth orbiting satellite and a second terminal remote from the first terminal, apparatus for transmitting the first beam from the first terminal for alignment with a second beam receptor located on the second terminal and for aligning and tracking the second beam transmitted by the second terminal with a first beam receptor located on the first terminal with sufficient accuracy to enable communication of data with the second beam, said apparatus comprising in combination:
   telescope means in the first terminal for transmitting the first beam and receiving the second beam at least in part along a common first path, said telescope means defining a first field of view;
   first beam deflector means for transmitting the first beam to the first path and receiving the second beam from the first path;
   first beam splitter means for directing the first beam from a transmission path onto the first beam deflector and for directing the second beam into a receive path;
   a track sensor defining a second field of view;
   second beam splitter means in the receive path for directing a predetermined percentage of the beam in the receive path along a track sensor path to the track sensor;
   an acquisition sensor defining a third field of view;
   second beam deflector means for deflecting part of the beam in the receive path along an acquisition sensor path to the acquisition sensor and part of the beam in the receive path onto the first beam receptor;
   first transmission optics means for transmitting the first beam along the transmission path;
   third beam deflector means for scanning the first beam in a predetermined scan pattern along the transmission path and for transmitting the scan pattern to the first beam splitter means; and
   controller means for altering the position of the first beam deflector means to adjust the second field of view relative to the track sensor and to adjust the third field of view relative to the acquisition sensor and for altering the position of the third beam deflector means to adjust the scan pattern to facilitate the commencement of tracking.

98. Apparatus, as claimed in claim 97, wherein the first beam receptor comprises an optical fiber.

99. Apparatus, as claimed in claim 97, wherein the acquisition sensor comprises a quadrant detector and wherein the controller means comprises a motor moving the first beam deflector so that the center of the third field of view detected by the quadrant detector is pointed toward the quadrant of the third field of view detected by the acquisition sensor.

100. Apparatus, as claimed in claim 97, and further comprising first focusing means in the track sensor path for focusing the beam in the track sensor path onto the track sensor and second focusing means in the acquisition sensor path for focusing the beam in the acquisition sensor path onto the acquisition sensor.

101. Apparatus, as claimed in claim 97, therein the track sensor comprises a quadrant detector.

102. Apparatus, as claimed in claim 97, wherein the telescope means comprises an assembly of mirrors.

103. Apparatus, as claimed in claim 97, wherein the first beam deflector means and second beam deflector means each comprises a movable mirror.

104. Apparatus, as claimed in claim 97, wherein the first beam splitter means comprises dichroic material.

105. Apparatus, as claimed in claim 97, wherein the first transmission optics means comprises one or more collimating lenses.

106. Apparatus, as claimed in claim 97, wherein the second beam deflector means comprises a second mirror defining a hole and enabling the beam passed into the receive path by the first beam deflector means to either be focused on the acquisition sensor or passed through the hole to the first beam receptor.

107. Apparatus, as claimed in claim 106, wherein the second mirror has a generally annular shape.

108. Apparatus, as claimed in claim 97, wherein the second beam splitter means enables about 10 percent of the beam in the receive path to be focused on the track sensor.

109. In a communication system employing an optical beam suitable for transmission of data between a first terminal located on an earth orbiting satellite and a second terminal remote from the first terminal, a method of aligning the beam received from the second terminal with a beam receptor located on the first terminal and defining a center point within a first uncertainty region which allows tracking of the beam with sufficient accuracy to enable communication of data with the optical beam, said method comprising in combination:
   receiving the beam and transmitting the beam along a path;
   locating the second terminal within a second uncertainty region larger than the first uncertainty region;
   detecting the intersection of the beam with the first terminal;
   locating the second terminal within a third uncertainty region larger than the first uncertainty region and smaller than the second uncertainty region in response to the detecting; and
   adjusting successively the position of the beam path relative to the beam receptor in response to the locating of the second terminal within the third uncertainty region whereby the size of the third uncertainty region is reduced to less than the first uncertainty region to facilitate the commencement of tracking of the beam.

110. A method, as claimed in claim 109, wherein the beam is a diffraction limited beam.

111. A method, as claimed in claim 109, wherein the third uncertainty region defines a locus of ray lines intersecting the first terminal and wherein the step of adjusting comprises successively directing at least one of the ray lines in the locus toward the center point.

112. A method, as claimed in claim 109, wherein the step of locating the second terminal within a third uncertainty region comprises the step of locating the second terminal within a quadrant of the second uncertainty region.

113. A method, as claimed in 109, wherein the step of detecting comprises detecting the rate of intersection of the beam with the first terminal.

114. A method, as claimed in claim 109, wherein the step of adjusting successively continues until the rate reaches a predetermined value.

115. In a communication system employing a optical beam suitable for transmission of data between a first terminal located on an earth orbiting satellite and a second terminal remote from the first terminal, a method of aligning the beam received from the second terminal with a beam receptor located on the first terminal to enable tracking of the beam with sufficient accuracy to enable communication of data with the beam, said method comprising in combination:
   receiving the beam within a first field of view having a first center point;
   detecting the occurrence of the beam within the first field of view;
   determining a portion of the first field of view in which the second terminal is located in response to the detecting of the beam within the first field of view;
   defining a second field of view having a second center point for receiving the beam in response to locating the second terminal within the portion of the first field of view; and
   pointing successively the second center point toward a region represented by the portion of the first field of view in which the second terminal is determined to be located until at least a portion of the beam is sufficiently aligned with the beam receptor to enable tracking.

116. A method, as claimed in claim 115, wherein the beam is a diffraction limited beam.

117. A method, as claimed in claim 115, wherein the first field of view is larger than the second field of view.

118. A method, as claimed in claim 115, wherein the step of defining comprises the step of altering size of the second field of view in accordance with the size of the portion of the first field of view in which second terminal is determined to be located.

119. A method, as claimed in claim 115, wherein the step of determining the location comprises the step of identifying a quadrant of the first field of view in which the second terminal is determined to be located.

120. A method, as claimed in 115, wherein the step of detecting comprises detecting the rate of occurrence of the beam within the first field of view.

121. A method, as claimed in claim 115, wherein the step of pointing successively continues until the rate reaches a predetermined value.

122. In a communication system employing a first optical beam and a second optical beam suitable for transmission of data between a first terminal located on an earth orbiting satellite and a second terminal remote from the first terminal, a method for transmitting the first beam from the first terminal for alignment with a second beam receptor located on the second terminal and for aligning the second beam transmitted by the second terminal with a first beam receptor located on the first terminal within a first uncertainty region which allows tracking of the second beam with sufficient accuracy to enable communication of data with the second beam, said method comprising in combination:
   transmitting the first beam over a controlled second uncertainty region with a first scan pattern defining a first locus of scan lines having a center scan line;
   receiving the second beam;
   determining successively the location of the second terminal within a third uncertainty region in response to receiving the second beam; and
   pointing the center scan line into the third uncertainty region successively to facilitate the commencement of tracking.

123. A method, as claimed in claim 122, wherein the first and second optical beams are diffraction limited beams.

124. A method, as claimed in claim 122, and further comprising the step of successively reducing the size of the second uncertainty region in accordance with the size of the third uncertainty region.

125. A method, as claimed in claim 122, wherein the second uncertainty region is larger than the third uncertainty region.

126. A method, as claimed in claim 122, and further comprising the step of successively reducing the size of the third uncertainty region to less than the size of the first uncertainty region.

127. A method, as claimed in claim 122, wherein the step of transmitting and the step of receiving are performed at least in part along a common path.

128. A method, as claimed in claim 122, wherein the first scan pattern comprises a spiral.

129. A method, as claimed in claim 122, wherein the step of transmitting comprises the step of causing the first scan pattern to comprise a spiral until the second uncertainty region is reduced to a predetermined size and then for causing the scan pattern to comprise a modified cycloid.

130. A method, as claimed in claim 122, wherein the step of determining comprises the step of determining successively the location of the second terminal within a quadrant of second uncertainty region.

131. In a communication system employing a first optical beam and a second optical beam suitable for transmission of data between a first terminal located on an earth orbiting satellite and a second terminal remote from the first terminal, a method for transmitting the first beam from the first terminal for alignment with a second beam receptor located on the second terminal and for aligning the second beam transmitted by the second terminal with a first beam receptor located on the first terminal to enable tracking of the second beam with sufficient accuracy to enable communication of data with the second beam, said method comprising in combination:
   defining a first field of view having a first center point enabling receipt of the second beam;
   transmitting the first beam over a second field of view having a second center point within the first field of view;
   defining a third field of view with a third center point in the first terminal; receiving at least a portion of the second beam;
   determining successively the location of the second terminal within a portion of the third field of view; and
   pointing successively the first and second center points toward a region represented by the portion of the third field of view in which the second terminal is determined to be located to facilitate the commencement of tracking.

132. A method, as claimed in claim 131, wherein the first and second optical beams are diffraction limited beams.

133. A method, as claimed in claim 131, wherein the first field of view is larger than the second field of view.

134. A method, as claimed in claim 131, wherein the first center point is capable of being aligned with the second center point.

135. A method, as claimed in claim 131, wherein the first scan pattern comprises a spiral.

136. A method, as claimed in claim 131, wherein the step of transmitting comprises the step of causing the first scan pattern to comprise a spiral until the second field of view is reduced to a predetermined size and then for causing the scan pattern to comprise a modified cycloid.

137. A method, as claimed in claim 131, wherein the step of determining comprises the step of determining successively the location of the second terminal within a quadrant of the third field of view.

138. In a communication system employing a first optical beam and a second optical beam suitable for transmission of data between a first terminal located on an earth orbiting satellite and a second terminal remote from the first terminal, a method for transmitting the first beam from the first terminal for alignment with a second beam receptor located on the second terminal and for aligning and tracking the second beam transmitted by the second terminal with a first beam receptor located on the first terminal with sufficient accuracy to enable communication of data with the second beam, said method comprising in combination:

transmitting the first beam and receiving the second beam at least in part along a common first path in the first terminal;

defining a first field of view for receiving the second beam in the first terminal;

transmitting the first beam to the first path;

receiving the second beam from the first path;

directing the second beam into a receive path;

sensing the second beam within a portion of a second field of view along a track sensor path;

directing a predetermined percentage of the beam in the receive path along the track sensor path;

sensing the beam within a portion of a third field of view along an acquisition sensor path;

transmitting part of the beam in the receive path along the acquisition sensor path and part of the beam in the receive path to the beam receptor;

transmitting the first beam along the transmission path;

scanning the first beam in a predetermined scan pattern along the transmission path;

directing the scan pattern from the transmission path to the first path; and adjusting the second field of view relative to the track sensor path, adjusting the third field of view relative to the acquisition sensor path and adjusting the scan pattern in response to sensing of the beam within a portion of the third field of view to facilitate the commencement of tracking.

139. A method, as claimed in claim 138, wherein the step of sensing the beam within a portion of a third field of view along an acquisition sensor path comprises the step of sensing the beam within a quadrant of the third field of view.

140. A method, as claimed in claim 138, wherein the step of adjusting comprises the step of pointing the center third field of view toward the quadrant in which the beam is sensed within the third field of view.

141. A method, as claimed in claim 138, and further comprising the step of focusing the beam in the track sensor path and focusing the beam in the acquisition sensor path.

142. A method, as claimed in claim 138, wherein the step of transmitting the first beam and receiving the second beam at least in part along a common first path in the first terminal comprises the step of reflecting the first beam and reflecting the second beam.

143. A method, as claimed in claim 138, wherein the step of directing the scan pattern from the transmission path to the first path and the step of directing the second beam into a receive path comprises the step of directing the beam through dichroic material.

144. A method, as claimed in claim 138, wherein the step of transmitting part of the beam in the receive path along the acquisition sensor path and part of the beam in the receive path to the beam receptor comprises the step of enabling about 50 percent of the beam to be transmitted to the acquisition sensor path and the remainder of the beam to be transmitted to the beam receptor.

145. A method, as claimed in claim 138, wherein the predetermined percentage is about 50 percent.

* * * * *